(12) United States Patent
Matsuhisa et al.

(10) Patent No.: US 12,285,073 B2
(45) Date of Patent: Apr. 29, 2025

(54) FOOTWEAR

(71) Applicant: ASICS CORPORATION, Kobe (JP)

(72) Inventors: Yuka Matsuhisa, Kobe (JP); Seiji Yano, Kobe (JP); Kenji Hirata, Kobe (JP); Genki Hatano, Kobe (JP)

(73) Assignee: ASICS CORPORATION, Kobe (JP)

( * ) Notice: Subject to any disclaimer, the term of this patent is extended or adjusted under 35 U.S.C. 154(b) by 0 days.

(21) Appl. No.: 18/379,455

(22) Filed: Oct. 12, 2023

(65) Prior Publication Data

US 2024/0122295 A1 Apr. 18, 2024

(30) Foreign Application Priority Data

Oct. 14, 2022 (JP) .................. 2022-165738

(51) Int. Cl.
*A43B 13/18* (2006.01)
*A43B 13/28* (2006.01)

(52) U.S. Cl.
CPC ............ *A43B 13/181* (2013.01); *A43B 13/28* (2013.01)

(58) Field of Classification Search
CPC ....... A43B 3/10; A43B 13/181; A43B 13/187; A43B 13/125; A43B 13/28
See application file for complete search history.

(56) References Cited

U.S. PATENT DOCUMENTS

| 2,178,025 A | 10/1939 | Richter |
| 3,878,626 A | 4/1975 | Isman |
| 4,446,633 A * | 5/1984 | Scheinhaus ............... A43B 7/24 D2/916 |
| 5,930,916 A * | 8/1999 | Connor ................. A43B 7/1455 36/141 |
| 6,014,821 A * | 1/2000 | Yaw ......................... A43B 5/08 36/8.1 |
| 6,029,372 A * | 2/2000 | Pan ......................... A43B 3/107 36/43 |

(Continued)

FOREIGN PATENT DOCUMENTS

| FR | 3007627 A1 | 1/2015 |
| JP | 2018187363 A | 11/2018 |

OTHER PUBLICATIONS

European Search Report issued Feb. 23, 2024 in corresponding European Application No. 23202607.0.

*Primary Examiner* — F Griffin Hall
(74) *Attorney, Agent, or Firm* — Global IP Counselors, LLP

(57) ABSTRACT

Footwear includes a shell including an outsole portion; and a sole body including a footbed portion. The footbed portion includes a shock absorbing portion formed of a three-dimensional mesh structure body so as to extend to a peripheral surface of the footbed portion. An engaged portion is disposed in an inner side surface of the outsole portion, and an engaging portion is disposed in a portion of the shock absorbing portion that corresponds to the peripheral surface. One of the engaged portion and the engaging portion is a protruding portion while the other one of the engaged portion and the engaging portion is a cutout portion provided as a recessed portion or a hole portion. An occupied volume ratio of a region including at least a portion defining the engaging portion in the shock absorbing portion is locally increased.

17 Claims, 21 Drawing Sheets

(56) References Cited

U.S. PATENT DOCUMENTS

| | | | | |
|---|---|---|---|---|
| 7,788,827 | B2* | 9/2010 | Fogg | A43B 3/128 36/103 |
| 8,109,012 | B2* | 2/2012 | Sarantakos | A43B 5/08 36/8.1 |
| 8,776,396 | B2* | 7/2014 | Huynh | A43B 3/108 36/11.5 |
| 9,993,045 | B2* | 6/2018 | Graffeo | A43B 5/002 |
| 10,070,687 | B2* | 9/2018 | Lockyer | A43B 13/14 |
| 10,631,592 | B2* | 4/2020 | Lee-Sang | A43B 13/04 |
| 10,986,895 | B2* | 4/2021 | Daniel | A43B 7/08 |
| 11,076,656 | B2* | 8/2021 | Kormann | A43B 13/125 |
| 11,363,855 | B2* | 6/2022 | Bellali | A43B 1/0009 |
| 11,758,984 | B1* | 9/2023 | Kaddouri | G06Q 10/101 12/146 BP |
| 11,786,008 | B2* | 10/2023 | Corcoran-Tadd | A43B 13/186 36/28 |
| 12,082,646 | B2* | 9/2024 | Coonrod | A43B 13/186 |
| 2004/0118015 | A1* | 6/2004 | Lai | A43B 5/08 36/141 |
| 2008/0060221 | A1* | 3/2008 | Hottinger | A43B 13/04 36/11.5 |
| 2013/0255103 | A1 | 10/2013 | Cho et al. | |
| 2013/0255106 | A1 | 10/2013 | Cho et al. | |
| 2015/0250259 | A1* | 9/2015 | Attey | A43B 3/128 36/103 |
| 2016/0242502 | A1 | 8/2016 | Spanks | |
| 2018/0271213 | A1* | 9/2018 | Perrault | A43B 13/141 |
| 2019/0231029 | A1* | 8/2019 | Dardinski | A43B 3/108 |
| 2021/0330030 | A1* | 10/2021 | Folsom | A43B 13/14 |

* cited by examiner

FOOTWEAR

CROSS REFERENCE TO RELATED APPLICATIONS

This nonprovisional application is based on Japanese Patent Application No. 2022-165738 filed on Oct. 14, 2022 with the Japan Patent Office, the entire contents of which are hereby incorporated by reference.

BACKGROUND

Technical Field

The present disclosure relates to footwear represented by sandals, shoes, and the like.

Background Information

Japanese Patent Laying-Open No. 2018-187363 discloses a footwear sole manufactured by a three-dimensional additive manufacturing method. The sole disclosed in the document mentioned above is formed of a three-dimensional mesh structure body with a three-dimensional lattice structure as a unit structure.

SUMMARY

Generally, a three-dimensional mesh structure body has a low degree of freedom for material selection due to manufacturing constraints for its production, and also has a surface including numerous holes. Thus, when the entire sole is formed of such a three-dimensional mesh structure body, it is difficult to ensure the durability at its ground contact surface.

As one method of solving the above-described problem, it is has been conceived to form a sole having a configuration divided into a sole body and an outsole that covers a lower surface of the sole body to define a ground contact surface, form the sole body from a three-dimensional mesh structure body, and form the outsole from a member having excellent durability, as disclosed in the above-mentioned document. In this case, as a method of fixing the outsole to the sole body, a commonly-used fixing method using an adhesive can be applicable, but other fixing methods not using an adhesive are desirable from the viewpoint of reducing the environmental load.

Thus, the present disclosure has been made in view of the above-described problems, and an object of the present disclosure is to provide footwear in which a sole body formed of a three-dimensional mesh structure body can be incorporated without using an adhesive.

Footwear according to the present disclosure includes: a shell including at least an outsole portion with a ground contact surface and a foot cover portion that covers an instep of a foot of a wearer; and a sole body that is detachably attached to the shell, the sole body including a footbed portion that supports a foot sole of the foot of the wearer in an attached state in which the sole body is attached to the shell. The outsole portion includes: an inner side surface that covers a peripheral surface of the footbed portion in the attached state, and an inner side bottom surface that covers a bottom surface of the footbed portion in the attached state. The footbed portion includes a shock absorbing portion formed of a single member made of an elastic body so as to extend to the peripheral surface of the footbed portion, and the shock absorbing portion is formed of a three-dimensional mesh structure body. An engaged portion is provided in the inner side surface of the outsole portion, and an engaging portion that engages with the engaged portion is provided in a portion of the shock absorbing portion corresponding to the peripheral surface of the footbed portion. One of the engaged portion and the engaging portion is formed as a protruding portion protruding in a direction substantially parallel to the ground contact surface, and the other one of the engaged portion and the engaging portion is formed as a cutout portion, the cutout portion being a recessed portion recessed in a direction substantially parallel to the ground contact surface or as a hole portion penetrating in the direction substantially parallel to the ground contact surface. In the footwear according to the present disclosure, by engaging the protruding portion with the cutout portion such that the protruding portion is sandwiched by the cutout portion in a direction intersecting the ground contact surface, the attached state is maintained, and an occupied volume ratio of a region including at least a portion defining the engaging portion in the shock absorbing portion is locally increased.

The foregoing and other objects, features, aspects, and advantages of the present disclosure will become apparent from the following detailed description of the present disclosure, which is understood in conjunction with the accompanying drawings.

BRIEF DESCRIPTION OF THE DRAWINGS

FIG. 1A is a schematic cross-sectional view showing the footwear in FIG. 1 and taken along a line XIA-XIA shown in FIG. 2, and FIGS. 11B and 11C each are a main-part enlarged cross-sectional view showing a main part of the footwear shown in FIG. 11A.

DETAILED DESCRIPTION

Figure 1:
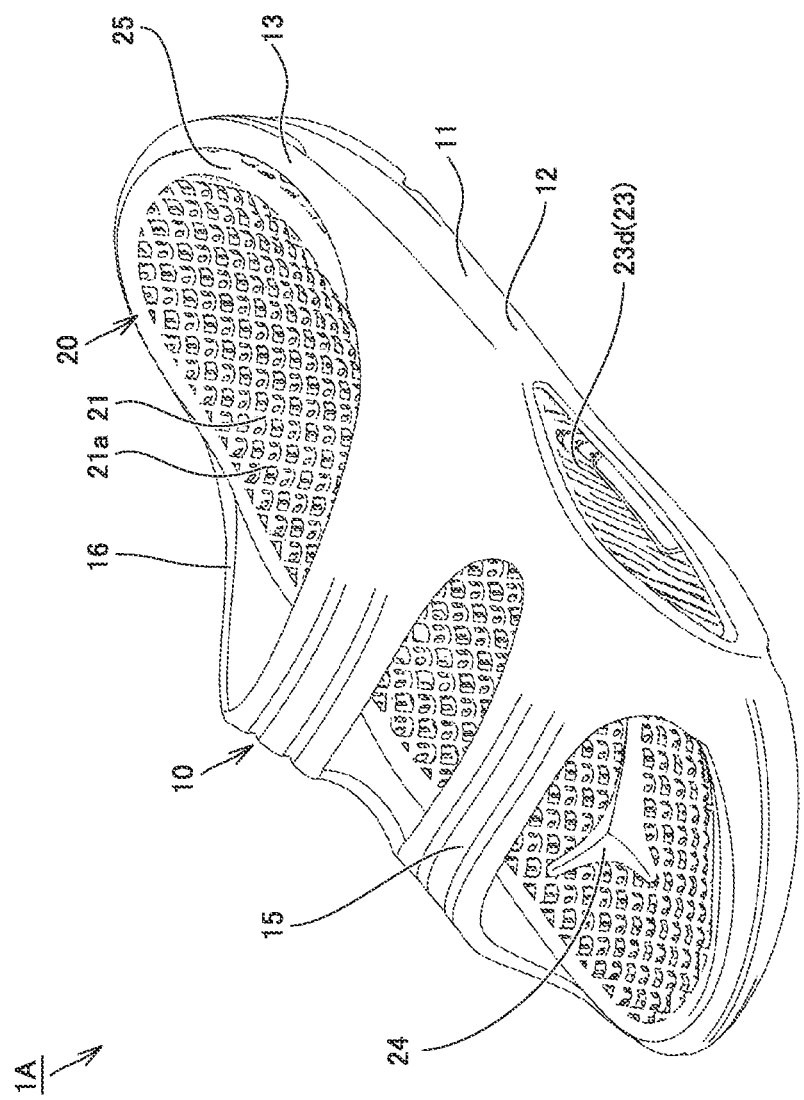
FIG. 1 is a perspective view of footwear according to a first embodiment.

The following describes embodiments of the present disclosure in detail with reference to the accompanying drawings. In the embodiments described below, the same or common portions are denoted by the same reference characters, and the description thereof will not be repeated.

First Embodiment

Figure 2:
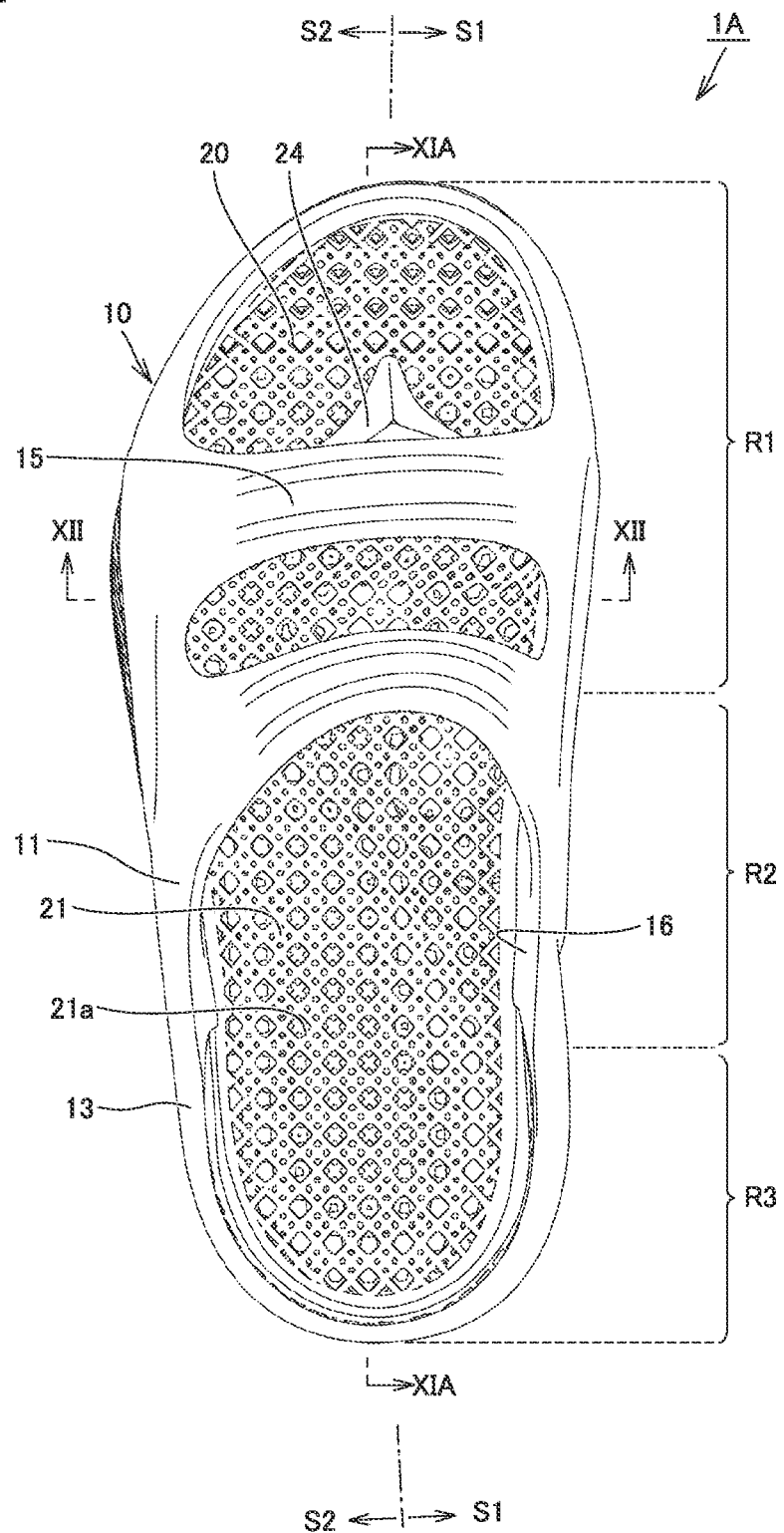
FIG. 2 is a plan view of the footwear shown in FIG. 1.

FIG. 1 is a perspective view of footwear according to the first embodiment as viewed obliquely from the upper right front side, and FIG. 2 is a plan view of the footwear shown in FIG. 1. First, a schematic configuration of footwear 1A according to the present embodiment will be described with reference to FIGS. 1 and 2.

As shown in FIGS. 1 and 2, the footwear 1A includes a shell 10 and a sole body 20. The footwear 1A is used in an attached state in which the sole body 20 is attached to the shell 10 as described later.

When the footwear 1A is used, a foot sole of the wearer is placed on the upper surface of the sole body 20. Thus, the sole body 20 is sandwiched by the shell 10 and the foot sole of the wearer, so that the sole body 20 supports the wearer's foot.

As shown in FIG. 2, the footwear 1A is divided into a forefoot portion R1, a midfoot portion R2, and a rearfoot portion R3 in a front-rear direction (the up-down direction in FIG. 2) corresponding to a foot length direction of the wearer's foot when seen in a plan view. The forefoot portion R1 supports a toe portion and a ball portion of the wearer's foot, the midfoot portion R2 supports an arch portion of the wearer's foot, and the rearfoot portion R3 supports a heel portion of the wearer's foot.

Further, when seen in a plan view, the footwear 1A is divided into a portion on the medial foot side (a portion on the S1 side shown in the figure) and a portion on the lateral foot side (a portion on the S2 side shown in the figure) in a left-right direction corresponding to a foot width direction of the wearer's foot (in the left-right direction in the figure). In this case, the portion on the medial foot side corresponds to the medial side of the foot in anatomical position (i.e., the side close to the midline) and the portion on the lateral foot side is opposite to the medial side of the foot in anatomical position (i.e., the side away from the midline).

The up-down direction of the footwear 1A (described later) means a direction corresponding to a thickness direction (i.e., the up-down direction in FIG. 5) of a base portion 12 (described later) of an outsole portion 11 having a flat shape and also corresponding to a thickness direction (i.e., the up-down direction in FIG. 9) of the sole body 20. More specifically, the up-down direction of the footwear 1A is orthogonal to the front-rear direction corresponding to the above-mentioned foot length direction of the wearer's foot and the left-right direction corresponding to the above-mentioned foot width direction of the wearer's foot.

Figure 3:
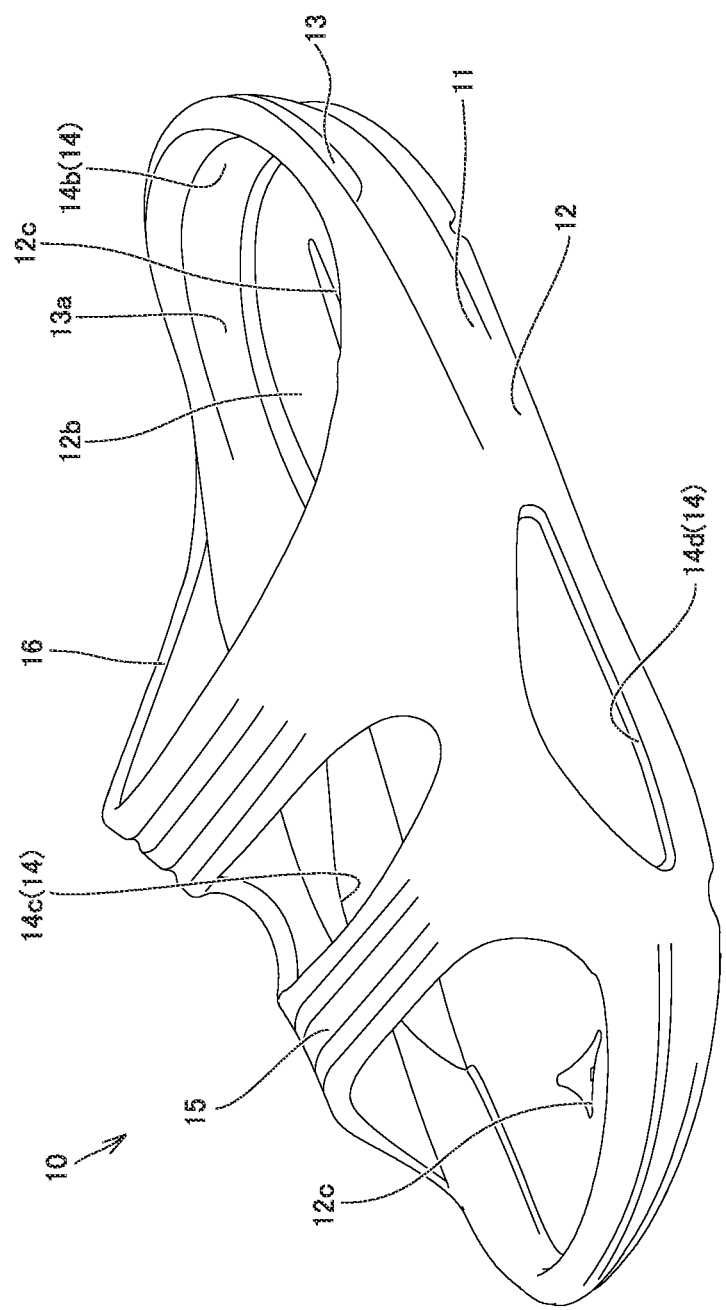
FIG. 3 is a perspective view of a shell shown in FIG. 1.
Figure 4:
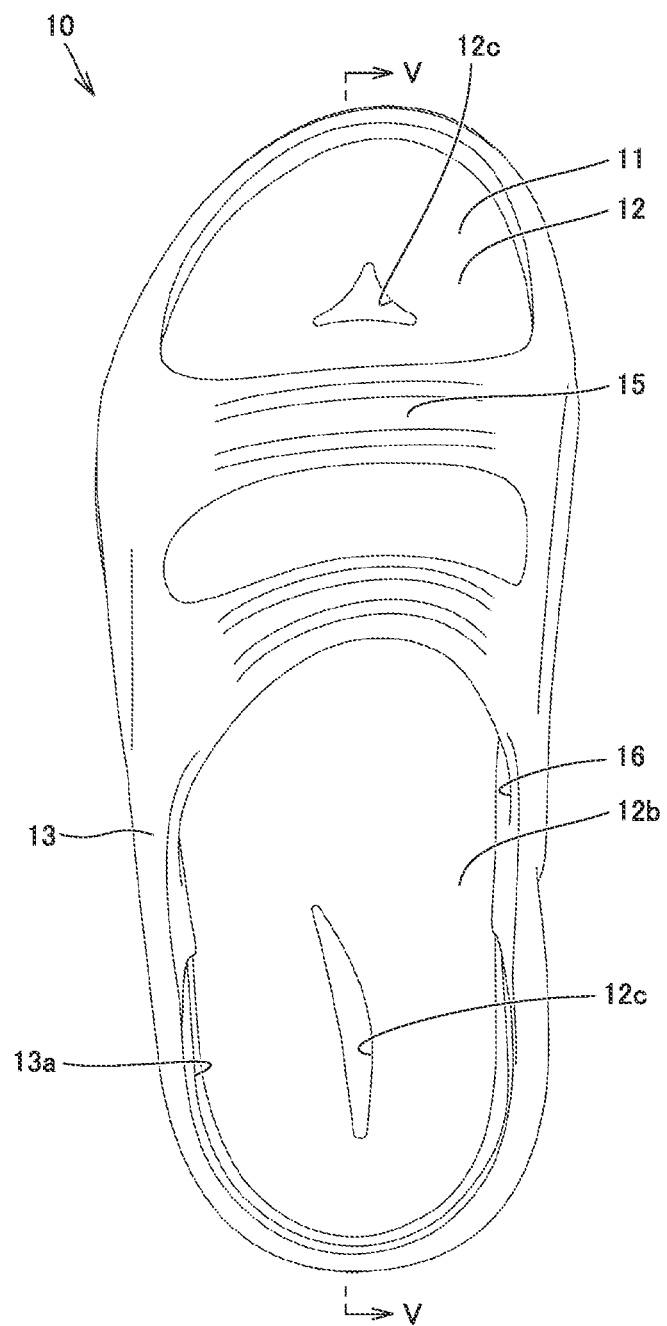
FIG. 4 is a plan view of the shell shown in FIG. 1.
Figure 5:
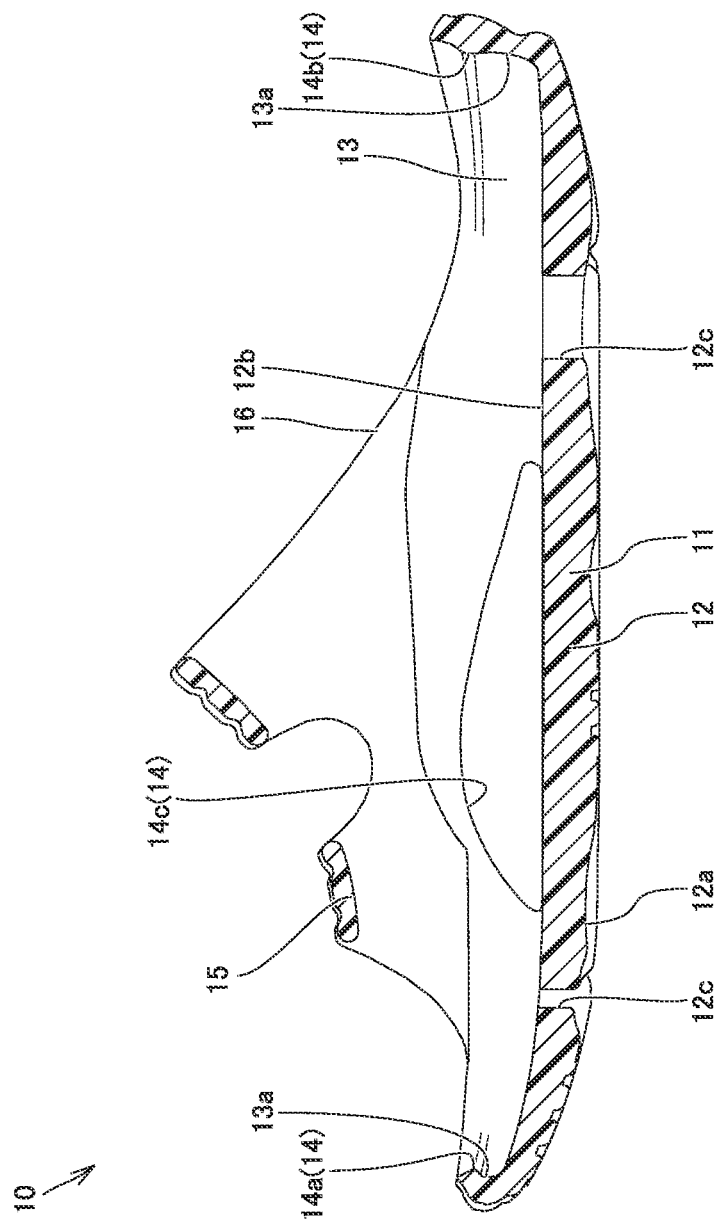
FIG. 5 is a schematic cross-sectional view showing the shell in FIG. 1 and taken along a line V-V shown in FIG. 4.

FIG. 3 is a perspective view of the shell shown in FIG. 1 as viewed obliquely from the upper right front side. FIG. 4 is a plan view of the shell shown in FIG. 1. FIG. 5 is a schematic cross-sectional view showing the shell and taken along a line V-V shown in FIG. 4. Then, a detailed configuration of the shell 10 according to the present embodiment will be described with reference to FIGS. 3 to 5 and FIGS. 1 and 2 described above.

As shown in FIGS. 1 to 5, the shell 10 includes an outsole portion 11 including aground contact surface 12a (see FIG. 5), and a foot cover portion 15 that covers an instep of the wearer's foot.

The outsole portion 11 includes the base portion 12 having a flat shape, and a peripheral wall portion 13 extending upward from a peripheral edge of the base portion 12. The outer side bottom surface of the base portion 12 defines the ground contact surface 12a contacts with the ground, a floor surface, or the like. An inner side bottom surface 12b of the base portion 12 and an inner side surface 13a of the peripheral wall portion 13 cover a bottom surface and a peripheral surface 22 (see FIG. 6 and the like), respectively, of a footbed portion 21 of the sole body 20 (described later) in the attached state.

The foot cover portion 15 covers the instep of the wearer's foot and is located above the outsole portion 11. In the footwear 1A according to the present embodiment, the foot cover portion 15 has two strap-shaped (i.e., strip-shaped) portions.

The foot cover portion 15 extends in the left-right direction to have a substantially mountain-like shape when viewed in the front-rear direction. The foot cover portion 15 has one end connected to a portion located on the medial foot side of the peripheral wall portion 13 and the other end connected to a portion located on the lateral foot side of the peripheral wall portion 13.

Thereby, a topline 16 is formed by a part of the peripheral wall portion 13 that is located rearward of the foot cover portion 15 and the rear end of the foot cover portion 15, and a hollow portion is provided between the outsole portion 11 and the foot cover portion 15. Thus, by inserting the wearer's foot into the hollow portion through the topline 16 in the state in which the sole body 20 is attached, the footwear 1A can be worn.

The base portion 12 is including a plurality of through holes 12c that extend to a portion defining the ground contact surface 12a and a portion defining the inner side bottom surface 12b. The plurality of through holes 12c ensure the air permeability during the use of the footwear 1A, which will be described later in detail. In the present embodiment, two through holes 12c are disposed in the base portion 12.

The two through holes 12c are located at positions corresponding to a ball portion and a heel portion of the wearer's foot in a central portion in the foot width direction, where air relatively tends to stay during use of the footwear 1A.

The inner side surface 13a of the peripheral wall portion 13 of the outsole portion 11 includes a plurality of engaged portions 14. In the present embodiment, four engaged portions 14 are provided, including a front-side engaged portion 14a, a rear-side engaged portion 14b, a medial foot-side engaged portion 14c, and a lateral foot-side engaged portion 14d.

As shown in FIGS. 3 and 5, the front-side engaged portion 14a is disposed in the front side portion of the outsole portion 11, and more specifically, is located in the inner side surface 13a of the peripheral wall portion 13 in the front end portion of the forefoot portion R1. The front-side engaged portion 14a is formed as a protruding portion protruding toward the inside of the shell 10 in the direction substantially parallel to the ground contact surface 12a of the outsole portion 11, and extends in the peripheral direction of the inner side surface 13a. The protruding portion is located substantially in a central portion of the inner side surface 13a in the up-down direction. The front-side engaged portion 14a is to engage with a front-side engaging portion 23a (described later) provided in the sole body 20.

The rear-side engaged portion 14b is disposed in the rear side portion of the outsole portion 11, and more specifically, is located in the inner side surface 13a of the peripheral wall portion 13 in the rear end portion of the rearfoot portion R3. The rear-side engaged portion 14b is a protruding portion protruding toward the inside of the shell 10 in the direction substantially parallel to the ground contact surface 12a, and extends in the peripheral direction of the inner side surface 13a. The protruding portion is located substantially in a central portion of the inner side surface 13a in the up-down direction. The rear-side engaged portion 14b engages with a rear-side engaging portion 23b (described later) disposed in the sole body 20.

The medial foot-side engaged portion 14c is provided in the medial foot-side portion of the outsole portion 11, and more specifically, is disposed in the inner side surface 13a of the peripheral wall portion 13 in the portion located on the medial foot side (i.e., the S1 side) in the left-right direction and extending over the boundary between the forefoot portion R1 and the midfoot portion R2. The medial foot-side engaged portion 14c is a hole portion provided as a cutout portion penetrating through the peripheral wall portion 13 in the direction substantially parallel to the ground contact surface 12a, and extends in the peripheral direction of the inner side surface 13a. The medial foot-side engaged portion 14c is to engage with a medial foot-side engaging portion 23c (described later) provided in the sole body 20.

The lateral foot-side engaged portion 14d is provided in the lateral foot-side portion of the outsole portion 11, and more specifically, is disposed in the inner side surface 13a of the peripheral wall portion 13 in the portion located on the lateral foot side (i.e., the S2 side) in the left-right direction and extending over the boundary between the forefoot portion R1 and the midfoot portion R2. The lateral foot-side engaged portion 14d is a hole portion provided as a cutout portion penetrating through the peripheral wall portion 13 in the direction substantially parallel to the ground contact surface 12a, and extends in the peripheral direction of the inner side surface 13a. The lateral foot-side engaged portion 14d engages with a lateral foot-side engaging portion 23d (described later) disposed in the sole body 20.

By engagement between the plurality of engaged portions 14 and a plurality of engaging portions 23 (described later) disposed in the sole body 20, the sole body 20 can be firmly fixed to the shell 10, which will be described later in detail.

The shell 10 can be made of any material as long as it has flexibility, but the material preferably has appropriate strength. From this viewpoint, the shell 10 is preferably made of resin or rubber material. More specifically, when the shell 10 is made of resin, it can be made, for example, of an ethylene-vinyl acetate copolymer (EVA), a polyolefin resin, a polyamide-based thermoplastic elastomer (TPA, TPAE), a thermoplastic polyurethane (TPU), and a polyester-based thermoplastic elastomer (TPEE). On the other hand, when the shell 10 is made of rubber, for example, butadiene rubber (BR) can be used.

The method of manufacturing the shell 10 is not particularly limited, and the shell 10 can be manufactured, for example, by injection molding, cast molding, or molding using a three-dimensional additive manufacturing apparatus.

Figure 6:
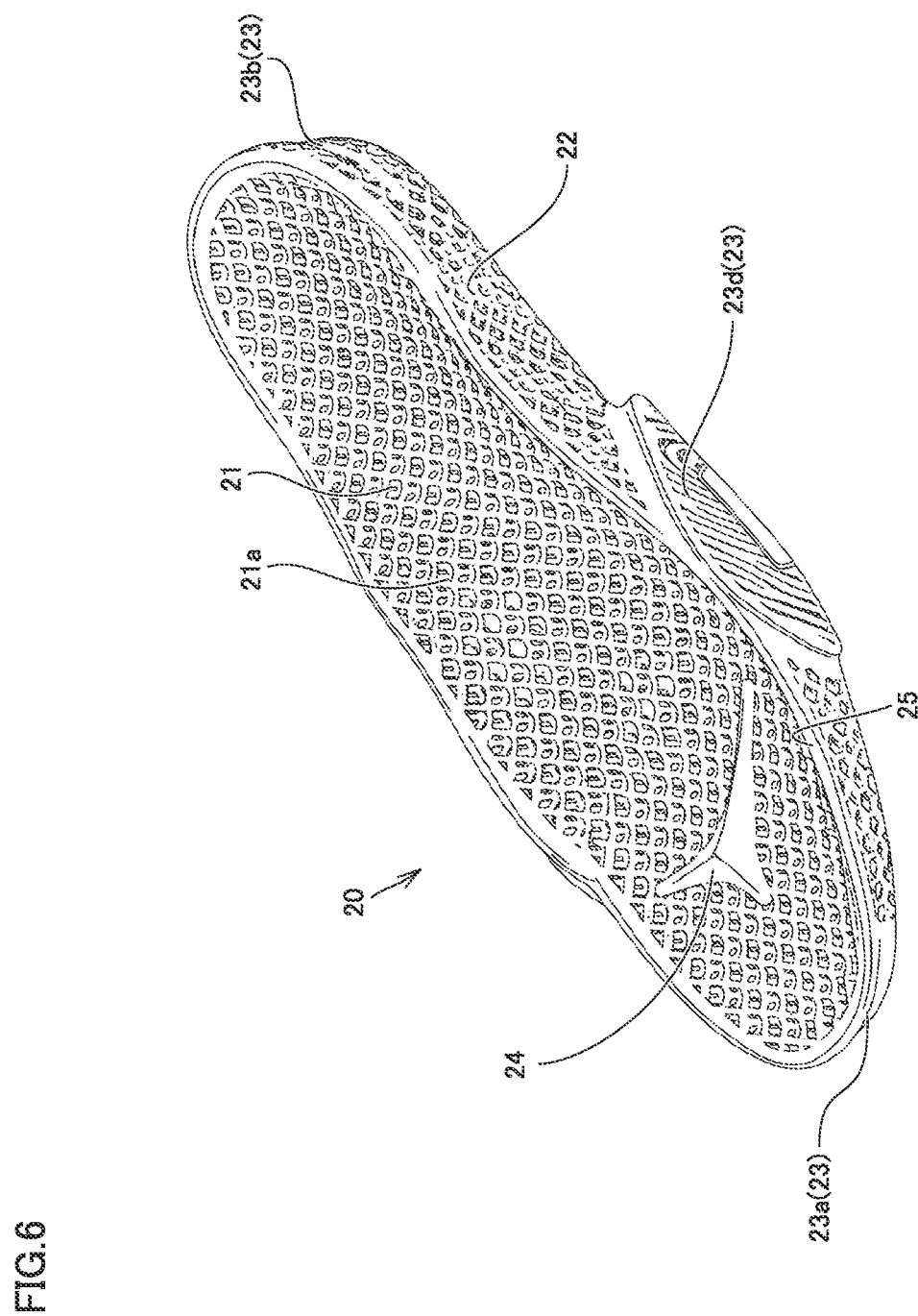
FIG. 6 is an oblique view of a sole body shown in FIG. 1 from an upper right front side.
Figure 7:
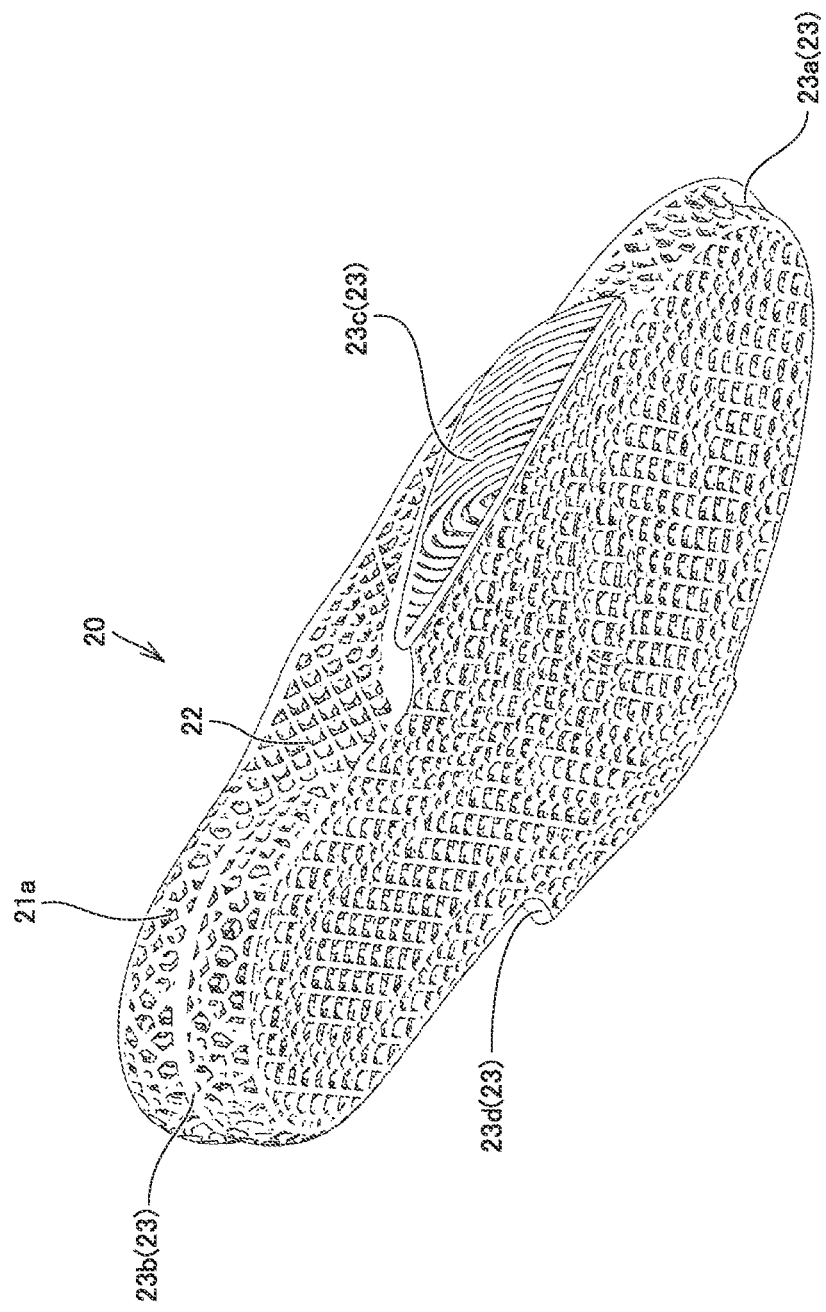
FIG. 7 is an oblique view of the sole body shown in FIG. 1 from a lower left rear side.
Figure 8:
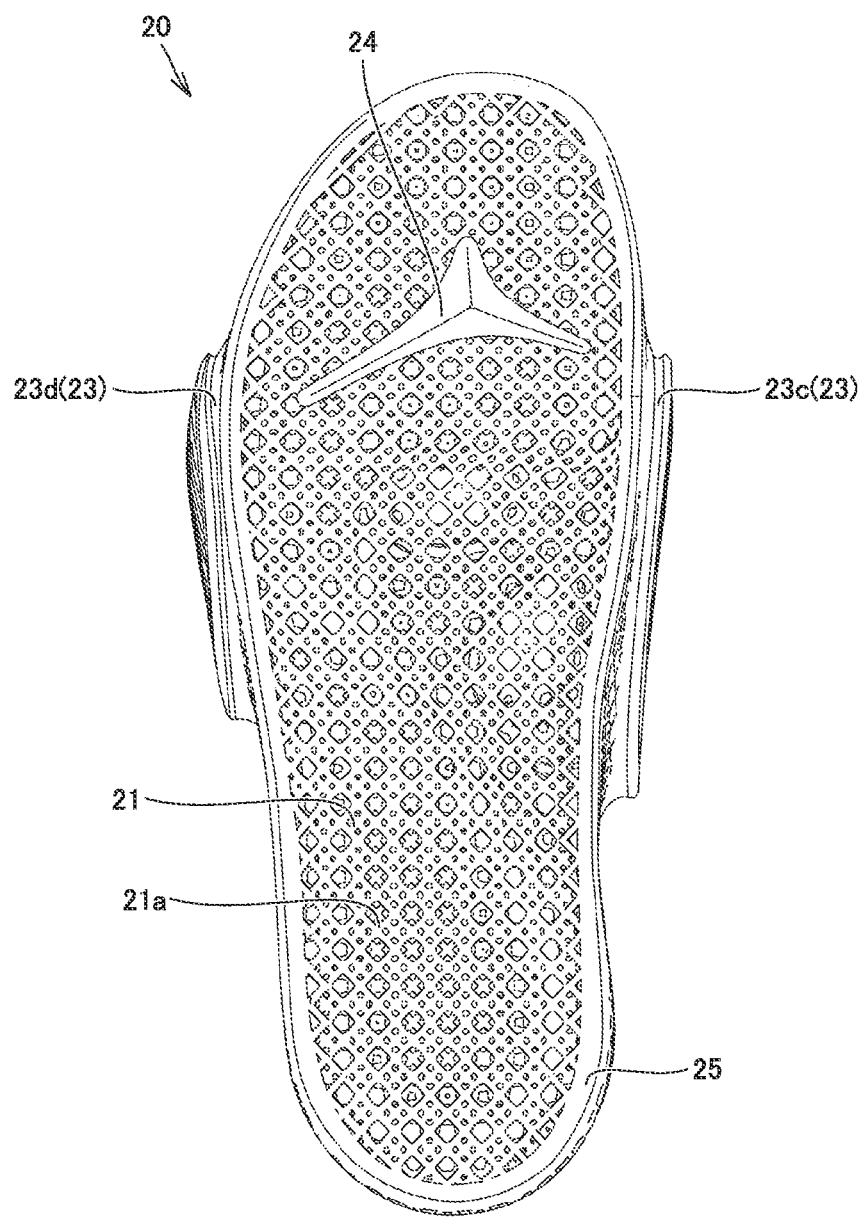
FIG. 8 is a plan view of the sole body shown in FIG. 1.
Figure 9:
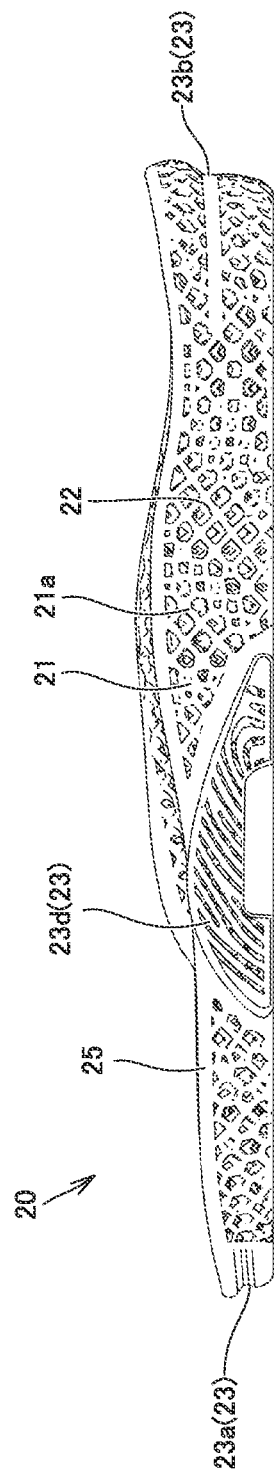
FIG. 9 is a side view of the sole body shown in FIG. 1 from a lateral foot side.

FIGS. 6 and 7 are perspective views of the sole body shown in FIG. 1 as viewed obliquely from the upper right front side and the lower left rear side, respectively. FIG. 8 is a plan view of the sole body shown in FIG. 1. FIG. 9 is a side view of the sole body shown in FIG. 1 as viewed from the lateral foot side. Then, a detailed configuration of the sole body 20 according to the present embodiment will be described with reference to FIGS. 6 to 9 and FIGS. 1 and 2 described above.

As shown in FIGS. 1, 2, and 6 to 9, the sole body 20 has a flat shape, and an outer shape of the sole body 20 in a plan view substantially coincides with an outer shape of the space defined by the base portion 12 and the peripheral wall portion 13 of the outsole portion 11.

The sole body 20 is formed of a three-dimensional mesh structure body made of a single member and is fabricated by a vat polymerization-type three-dimensional additive manufacturing method.

The sole body 20 is detachably attached to the shell 10 and includes the footbed portion 21 that supports the foot sole of the wearer's foot in the attached state. The footbed portion 21 includes a shock absorbing portion 21a formed of a single member made of an elastic body to extend to the peripheral surface 22 and the bottom surface of the footbed portion 21.

The footbed portion 21 has a peripheral edge portion formed to be higher in its thickness direction than the height of the portion of the peripheral wall portion 13 of the outsole portion 11 that corresponds to the peripheral edge portion of the footbed portion 21. Thus, as shown in FIG. 1, in the attached state, the upper end portion of the peripheral edge portion of the footbed portion 21 is located above the upper end portion of the peripheral wall portion 13 of the outsole portion 11. Thereby, the upper end portion of the peripheral surface 22 of the footbed portion 21 is exposed to the outside.

The configuration described above enables the footwear 1A to have excellent design properties. Further, the peripheral wall portion 13 of the outsole portion 11 has appropriate strength and extends upwardly. Thus, when the peripheral wall portion 13 contacts the wearer's foot sole, the wearer's foot can feel uncomfortable. In this regard, when the upper end portion of the peripheral edge portion of the footbed portion 21 having flexibility is located above the upper end portion of the peripheral wall portion 13 of the outsole portion 11, direct contact of the wearer's foot sole with the peripheral wall portion 13 can be prevented, with the result that an improved feel of contact for the wearer's foot can be achieved. Note that the upper end portion of the peripheral surface 22 of the footbed portion 21 does not necessarily have to be exposed to the outside in the attached state. Still, the peripheral surface can be entirely covered by the peripheral wall portion 13 of the outsole portion 11.

As shown in FIGS. 1 and 6 to 9, a plurality of engaging portions 23 are provided in respective portions of the shock absorbing portion 21a that correspond to the peripheral surface 22 of the footbed portion 21. In the present embodiment, four engaging portions 23 are provided, including the front-side engaging portion 23a, the rear-side engaging portion 23b, the medial foot-side engaging portion 23c, and the lateral foot-side engaging portion 23d.

The front-side engaging portion 23a is disposed in the front side portion of the footbed portion 21, and more specifically, is located in the peripheral surface 22 in the front end portion of the forefoot portion R1. The front-side engaging portion 23a is formed as a recessed portion provided as a cutout portion recessed toward the inside of the sole body 20 and extends in the peripheral direction of the peripheral surface 22. The recessed portion is located substantially in a central portion of the peripheral surface 22 in the up-down direction. In the attached state, the front-side engaging portion 23a is located to be recessed toward the inside of the shell 10 in the direction substantially parallel to the ground contact surface 12a of the outsole portion 11. The front-side engaging portion 23a engages with the front-side engaged portion 14a provided in the outsole portion 11.

The rear-side engaging portion 23b is disposed in the rear side portion of the footbed portion 21, and more specifically, is located in the peripheral surface 22 in the rear end portion of the rearfoot portion R3. The rear-side engaging portion 23b as a recessed portion provided as a cutout portion recessed toward the inside of the sole body 20 and extends in the peripheral direction of the peripheral surface 22. The recessed portion is located substantially in the central portion of the peripheral surface 22 in the up-down direction. In the attached state, the rear-side engaging portion 23b is recessed toward the inside of the shell 10 in the direction substantially parallel to the ground contact surface 12a of the outsole portion 11. The rear-side engaging portion 23b is to engage with the rear-side engaged portion 14b provided in the outsole portion 11.

The medial foot-side engaging portion 23c is disposed in the medial foot-side portion of the footbed portion 21, and more specifically, is disposed in the peripheral surface 22 in the portion located on the medial foot side (i.e., the S1 side) in the left-right direction and extending over the boundary between the forefoot portion R1 and the midfoot portion R2. The medial foot-side engaging portion 23c is formed as a protruding portion protruding toward the outside of the sole body 20 and extending in the peripheral direction of the peripheral surface 22. In the attached state, the medial foot-side engaging portion 23c is located to protrude outward in the direction substantially parallel to the ground contact surface 12a of the outsole portion 11. The medial foot-side engaging portion 23c is to engage with the medial foot-side engaged portion 14c provided in the outsole portion 11. When viewed in the direction in which the medial foot-side engaging portion 23c protrudes, the outer shape of the medial foot-side engaging portion 23c substantially coincides with the outer shape of the medial foot-side engaged portion 14c formed as a hole portion.

The lateral foot-side engaging portion 23d is disposed in the lateral foot-side portion of the footbed portion 21, and more specifically, is disposed in the peripheral surface 22 in the portion located on the lateral foot side (i.e., the S2 side) in the left-right direction and extending over the boundary between the forefoot portion R1 and the midfoot portion R2. The lateral foot-side engaging portion 23d is a protruding portion protruding toward the outside of the sole body 20 and extending in the peripheral direction of the peripheral surface 22. In the attached state, the lateral foot-side engaging portion 23d protrudes outwardly in the direction substantially parallel to the ground contact surface 12a of the outsole portion 11. The lateral foot-side engaging portion 23d engages with the lateral foot-side engaged portion 14d provided in the outsole portion 11. When viewed in the direction in which the lateral foot-side engaging portion 23d protrudes, the outer shape of the lateral foot-side engaging portion 23d substantially coincides with the outer shape of the lateral foot-side engaged portion 14d formed as a hole portion.

By the configuration in which the medial foot-side engaging portion 23c and the lateral foot-side engaging portion 23d are exposed on the outer surface of the footwear 1A, excellent design properties can be imparted to the footwear 1A. In addition, for example, by the configuration in which the outer shapes of these engaging portions when viewed in their protruding directions can be customized, the footwear 1A imparted with design properties according to the wearer's preference can be implemented.

As shown in FIGS. 6 and 8, a ridge portion 24 over which a finger is hooked is disposed on the top surface of the footbed portion 21. The ridge portion 24 is disposed in a region on the top surface that corresponds to the forefoot portion R1, the region serving to support a part of the foot sole between the toe portion and the ball portion of the wearers foot. Also, the ridge portion 24 extends in the left-right direction and is partially branched and extends in the front-rear direction.

The shape of the ridge portion 24 is not limited to the shape described above but can be variously changed. For example, the ridge portion 24 can be configured to have only a portion extending in the left-right direction or, according to the number of gap spaces between the wearer's toes, can be configured to have four portions branched from the portion that extends in the left-right direction and then extending in the front-rear direction.

The material of the sole body 20 is not particularly limited but is preferably a resin material or a rubber material so as to allow additive manufacturing by a vat polymerization-type three-dimensional additive manufacturing method and so as to allow the additively manufactured sole body 20 to have appropriate flexibility, elongation, durability, elasticity, stability, and the like. More specifically, when the sole body 20 is made of resin, examples of resin can be a polyolefin resin, ethylene-vinyl acetate copolymer (EVA), polyamide-based thermoplastic elastomer (TPA, TPAE), thermoplastic polyurethane (TPU), or polyester-based thermoplastic elastomer (TPEE). On the other hand, when the sole body 20 is made of rubber, for example, butadiene rubber (BR) can be used.

The sole body 20 can also be formed of a polymer composition. Examples of polymer to be contained in the polymer composition include olefinic polymers such as olefinic elastomers and olefinic resins. Examples of the olefinic polymers include polyolefins such as polyethylene (e.g., linear low density polyethylene (LLDPE), high density polyethylene (HDPE), and the like), polypropylene, ethylene-propylene copolymer, propylene-1-hexene copolymer, propylene-4-methyl-1-pentene copolymer, propylene-1-butene copolymer, ethylene-1-hexene copolymer, ethylene-4-methyl-pentene copolymer, ethylene-1-butene copolymer, 1-butene-1-hexene copolymer, 1-butene-4-methyl-pentene, ethylene-methacrylic acid copolymer, ethylene-methyl methacrylate copolymer, ethylene-ethyl methacrylate copolymer, ethylene-butyl methacrylate copolymer, ethylene-methyl acrylate copolymer, ethylene-ethyl acrylate copolymer, ethylene-butyl acrylate copolymer, propylene-methacrylic acid copolymer, propylene-methyl methacrylate copolymer, propylene-ethyl methacrylate copolymer, propylene-butyl methacrylate copolymer, propylene-methyl acrylate copolymer, propylene-ethyl acrylate copolymer, propylene-butyl acrylate copolymer, ethylene-vinyl acetate copolymer, propylene-vinyl acetate copolymer, and the like.

Examples of the polymer can be an amide-based polymer such as an amide-based elastomer and an amide-based resin. Examples of the amide-based polymer include polyamide 6, polyamide 11, polyamide 12, polyamide 66, polyamide 610, and the like.

Examples of the polymer can be an ester-based polymer such as an ester-based elastomer and an ester-based resin. Examples of the ester-based polymer include polyethylene terephthalate, polybutylene terephthalate, and the like.

Examples of the polymer can be a urethane-based polymer such as a urethane-based elastomer and a urethane-based resin. Examples of the urethane-based polymer include polyester-based polyurethane, polyether-based polyurethane, and the like.

Examples of the polymer can be a styrene-based polymer such as a styrene-based elastomer and a styrene-based resin. Examples of the styrene-based elastomer include styrene-ethylene-butylene copolymer (SEB), styrene-butadiene-styrene copolymer (SBS), a hydrogenated product of SBS (styrene-ethylene-butylene-styrene copolymer (SEBS)), styrene-isoprene-styrene copolymer (SIS), a hydrogenated product of SIS (styrene-ethylene-propylene-styrene copolymer (SEPS)), styrene-isobutylene-styrene copolymer (SIBS), styrene-butadiene-styrene-butadiene (SBSB), styrene-butadiene-styrene-butadiene-styrene (SBSBS), and the like. Examples of the styrene-based resin include polystyrene, acrylonitrile styrene resin (AS), acrylonitrile butadiene styrene resin (ABS), and the like.

Examples of the polymer include acrylic polymers such as polymethylmethacrylate, urethane-based acrylic polymers, polyester-based acrylic polymers, polyether-based acrylic polymers, polycarbonate-based acrylic polymers, epoxy-based acrylic polymers, conjugated diene polymer-based acrylic polymers and hydrogenated products thereof, urethane-based methacrylic polymers, polyester-based methacrylic polymers, polyether-based methacrylic polymers, polycarbonate-based methacrylic polymers, polyester-based urethane acrylate, polycarbonate-based urethane acrylate, polyether-based urethane acrylate, epoxy-based methacrylic polymers, conjugated diene polymer-based methacrlic polymers and hydrogenated products thereof, polyvinyl chloride-based resins, silicone-based elastomers, butadiene rubber, isoprene rubber (IR), chloroprene rubber (CR), natural rubber (NR), styrene-butadiene rubber (SBR), acrylonitrile-butadiene rubber (NBR), butyl rubber (IIR), and the like.

The sole body 20 is preferably made of a material that enables flexibility and a less slippery wearing comfort, and thus, the sole body 20 is preferably made particularly of urethane acrylate among the types of materials mentioned above. The sole body 20 made of urethane acrylate has excellent durability and elongation and sufficient elasticity. As described above, since the sole body 20 is produced by the vat polymerization-type three-dimensional additive manufacturing method, the sole body 20 contains a curing agent as a sub-component.

The sole body 20 including the shock absorbing portion 21a is formed of a three-dimensional mesh structure body. The three-dimensional mesh structure body has a structure in which a plurality of unit structures with hollow portions provided therein are repeatedly arranged to be adjacent to each other. Examples of such a unit structure include a three-dimensional lattice structure having a three-dimensional shape in which a plurality of columnar portions extending in prescribed directions are connected to each other, a three-dimensional wall structure having a three-dimensional shape in which a plurality of wall portions extending in prescribed directions are connected to each other, a structure having a three-dimensional shape in which hollow portions are regularly arranged therein, and the like.

Applicable examples of the three-dimensional lattice structure defining a unit structure can be a structure in which a plurality of columnar portions are arranged so that each columnar portion extends to intersect a columnar portion adjacent thereto. Applicable examples of such a three-dimensional lattice structure can be various structures such as a rectangular parallelepiped lattice, a diamond lattice, an octahedral lattice, a double pyramid lattice, a fluorite type lattice, or a lattice having various supports added thereto.

Applicable examples of the three-dimensional wall structure defining a unit structure can be a structure with a three-dimensional shape formed by a wall with an outer shape defined by a pair of parallel curved surfaces. Specific examples applicable in this case can be, for example, a structure obtained by adding a thickness to a triply periodic minimal surface, such as a gyroid structure, a Schwartz P structure, or a Schwartz D structure as a base structure. Further, applicable examples of the three-dimensional wall structure defining a unit structure can be a three-dimensional shape formed by a wall having an outer shape defined by a pair of parallel flat surfaces. Specific examples applicable in this case can be a structure obtained by adding a thickness to an octet structure, a cubic structure, or the like.

When the sole body 20 is formed of the three-dimensional mesh structure body as described above, it is preferable to distort individual unit structures as necessary such that the outer shape of the three-dimensional mesh structure body coincides with the outer shape of the sole body 20, which allows the sole body 20 to have a smooth outer surface.

The sole body 20 formed of a three-dimensional mesh structure body as described above has high deformability. This makes it possible to implement a sole that is excellent in wearing comfort with excellent shock absorbing performance and also enhanced in stability during wearing of the footwear. Further, the sole body 20 having the above-described configuration makes it possible to implement a sole lightweight considering its size and excellent in air permeability.

In this case, in the footwear 1A according to the present embodiment, the occupied volume ratio of the region including at least the portion defining the engaging portion 23 in the shock absorbing portion 21a is locally increased.

More specifically, as shown in FIGS. 6, 7, and 9, FIGS. 11A to 11C (described later), and FIG. 12, the shock absorbing portion 21a in a region including the portion defining the front-side engaging portion 23a and the portions located above and below is formed of a three-dimensional mesh structure body (i.e., a solid body) whose occupied volume ratio is 100%.

Figure 11A:
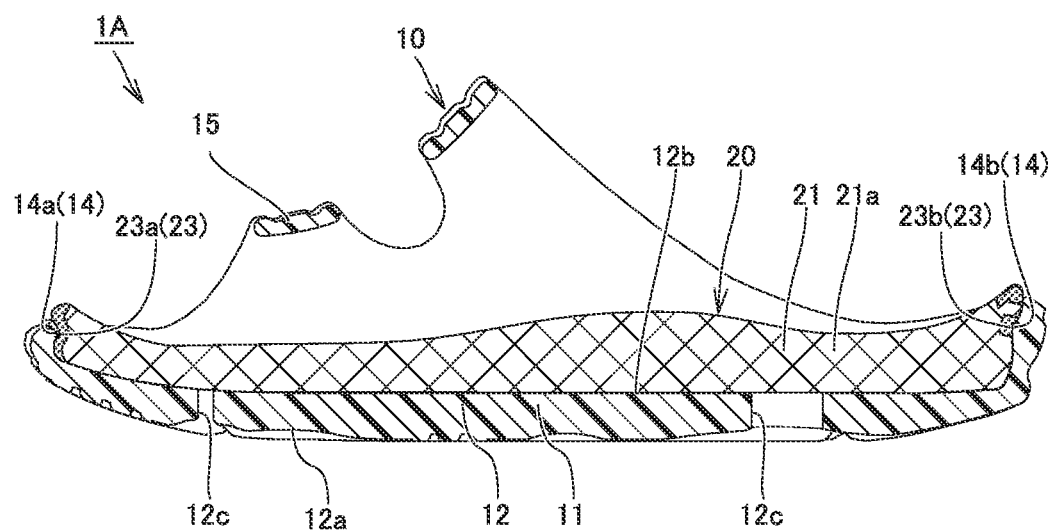
Figure 11B:
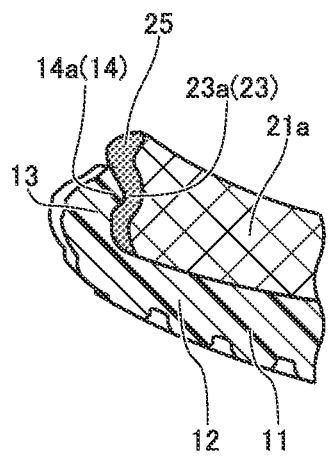
Figure 11C:
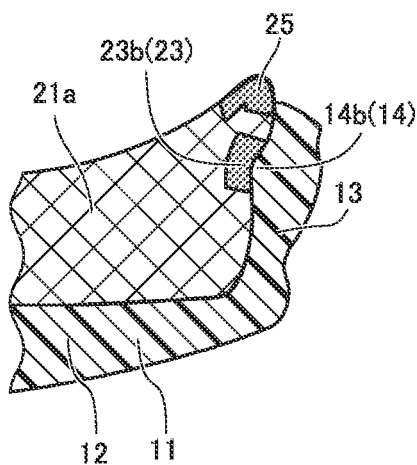

The shock absorbing portion 21a in a region including the portion defining the rear-side engaging portion 23b is also formed of a three-dimensional mesh structure body whose occupied volume ratio is 100%. In FIGS. 11A to 11C, to facilitate understanding, the shock absorbing portion 21a in a region where the occupied volume ratio is locally increased is shown as distinguished from other portions of the shock absorbing portion 21a (the same also applies to FIGS. 12 to 17G described later). In the following description, a region of the shock absorbing portion 21a where the occupied volume ratio is locally increased is also referred to as a solid region.

By engagement between the plurality of engaging portions 23 formed as described above and the plurality of engaged portions 14 disposed in the outsole portion 11, the sole body 20 formed of a three-dimensional mesh structure body can be incorporated into the footwear 1A without using an adhesive, which will be described later in detail.

As shown in FIG. 6 to FIG. 9, FIGS. 11A to 11C, and FIG. 12, in the portion of the shock absorbing portion 21a that defines a corner portion 25 as a boundary portion between the peripheral surface 22 and the top surface of the footbed portion 21, the occupied volume ratio in this portion is locally increased over the entire periphery. More specifically, the portion of the shock absorbing portion 21a that defines the corner portion 25 is formed of a three-dimensional mesh structure body whose occupied volume ratio is 100%, and thus, this portion is reinforced.

The corner portion 25 rubs against the shell 10 or receives a concentrated load during walking of the wearer and thereby tends to be easily damaged. Thus, reinforcing the corner portion 25 as described above can improve the durability of the sole body 20.

As shown in FIGS. 11A and 11B, the solid region including the front-side engaging portion 23a in the shock absorbing portion 21a extends to the corner portion 25. Thereby, a reinforcing portion extending in the up-down direction is formed at the front end portion of the sole body 20, with the result that the durability of the sole body 20 can be further improved.

Figure 10:
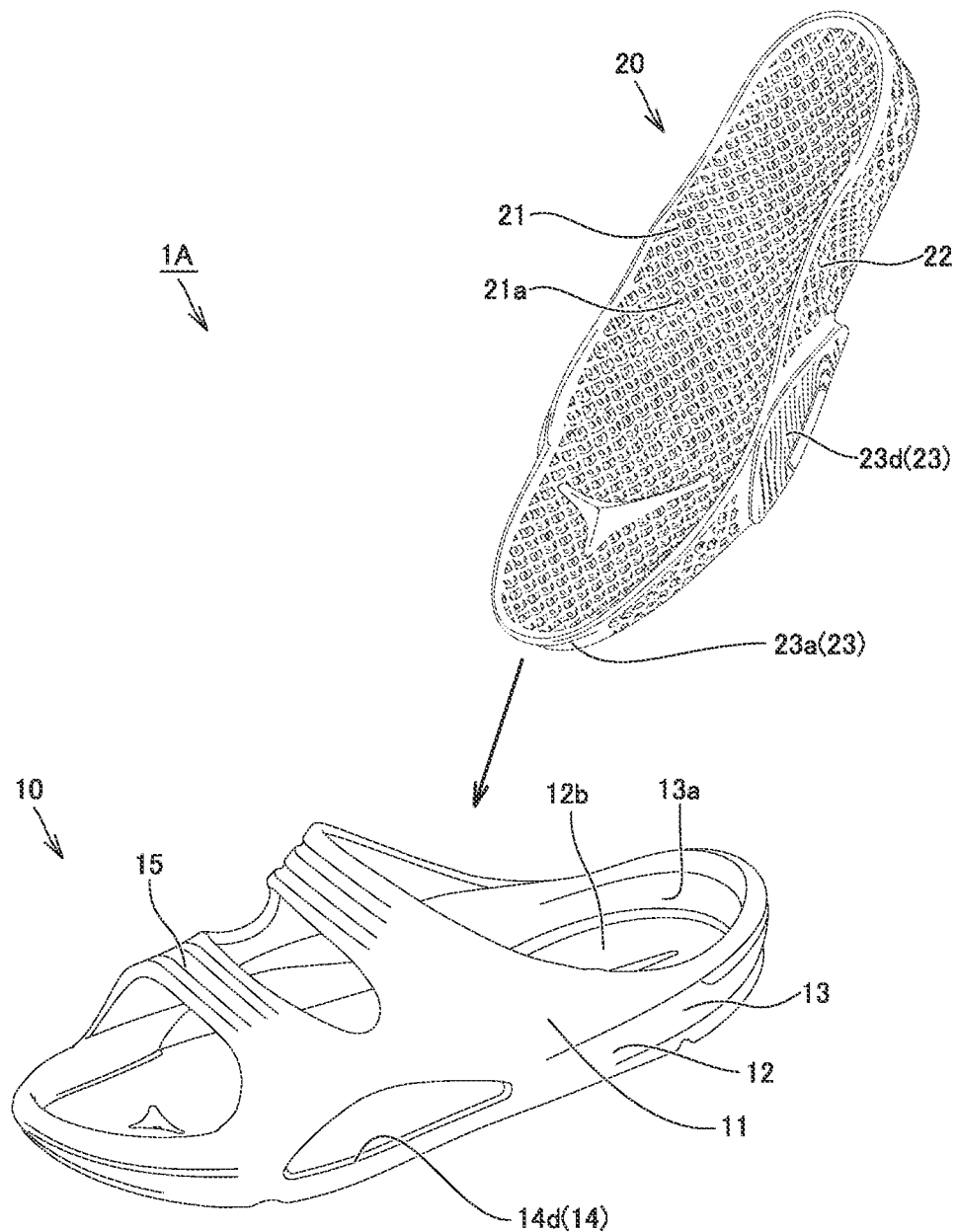
FIG. 10 is a schematic view illustrating a method of attaching the sole body shown in FIG. 6 to the shell shown in FIG. 3.

FIG. 10 is a schematic view illustrating a method of attaching the sole body shown in FIG. 6 to the shell shown in FIG. 3. FIG. 11A is a schematic cross-sectional view showing the footwear taken along a line XIA-XIA shown in FIG. 2. FIG. 11B is a main-part enlarged cross-sectional view showing the front-side engaged portion in FIG. 11A and the vicinity thereof, and FIG. 11C is a main-part enlarged cross-sectional view showing the rear-side engaged portion in FIG. 11A and the vicinity thereof. FIG. 12 is a schematic cross-sectional view showing the footwear taken along a line XII-XII shown in FIG. 2. Referring to FIGS. 10 to 12, the following describes a method of attaching the sole body 20 to the shell 10 in the footwear 1A according to the present embodiment and the state in which the sole body 20 engages with the shell 10 after the sole body 20 is attached to the shell 10.

As shown in FIG. 10, when the footwear 1A is used, the sole body 20 is inserted into the hollow portion of the shell 10 through the topline 16 provided in the shell 10. By inserting the sole body 20 into the shell 10 in this way, the bottom surface of the footbed portion 21 is placed on the inner side bottom surface 12b of the base portion 12 of the outsole portion 11 to face the inner side bottom surface 12b, and the peripheral surface 22 of the footbed portion 21 is placed to face the inner side surface 13a of the peripheral wall portion 13 of the outsole portion 11. Further, the plurality of through holes 12c provided in the base portion 12 of the outsole portion 11 face a portion of the shock absorbing portion 21a that corresponds to the bottom surface of the footbed portion 21.

In this case, as shown in FIG. 11A, when the sole body 20 is inserted into the shell, the front-side engaging portion 23a of the sole body 20 is engaged with the front-side engaged portion 14a of the outsole portion 11 in the front side portion of the footwear 1A, and the rear-side engaging portion 23b of the sole body 20 is engaged with the rear-side engaged portion 14b of the outsole portion 11 in the rear side portion of the footwear 1A.

More specifically, as shown in FIG. 11B, the front-side engaged portion 14a formed as a protruding portion engages with the front-side engaging portion 23a formed as a recessed portion provided as a cutout portion. Thereby, the front-side engaged portion 14a is sandwiched by the front-side engaging portion 23a in the up-down direction intersecting the ground contact surface 12a.

Similarly, as shown in FIG. 11C, the rear-side engaged portion 14b formed as a protruding portion engages with the rear-side engaging portion 23b formed as a recessed portion provided as a cutout portion. Thereby, the rear-side engaged portion 14b is sandwiched by the rear-side engaging portion 23b in the up-down direction intersecting the ground contact surface 12a.

Thus, the front-side engaging portion 23a engages with the front-side engaged portion 14a and the rear-side engaging portion 23b engages with the rear-side engaged portion 14b, with the result that the movement of the sole body 20 relative to the shell 10 in the thickness direction (i.e., the up-down direction of the footwear 1A) and the left-right direction (i.e., the foot width direction of the wearers foot) is limited. This maintains the attached state in which the sole body 20 is attached to the shell 10.

Figure 12:
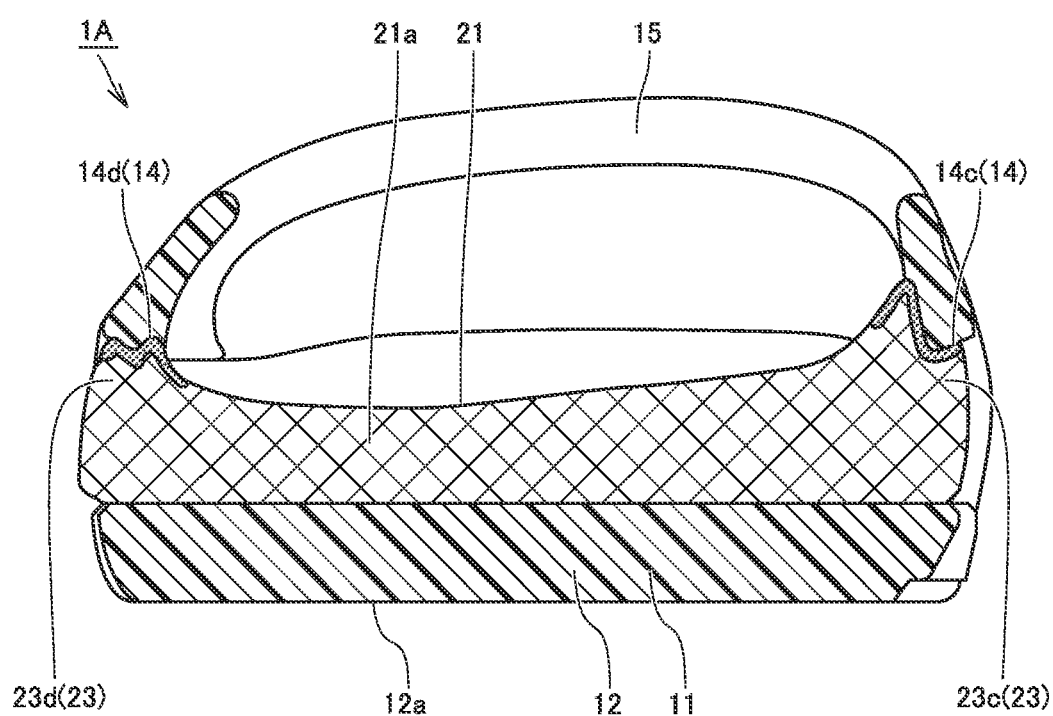
FIG. 12 is a schematic cross-sectional view showing the footwear in FIG. 1 and taken along a line XII-XII shown in FIG. 2.

Further, as shown in FIG. 12, when the sole body 20 is attached to the shell 10 as described above, the medial foot-side engaging portion 23c of the sole body 20 is engaged with the medial foot-side engaged portion 14c of the outsole portion 11 in the medial foot-side portion of the footwear 1A, and the lateral foot-side engaging portion 23d of the sole body 20 is engaged with the lateral foot-side engaged portion 14d of the outsole portion 11 in the lateral foot-side portion of the footwear 1A.

More specifically, the medial foot-side engaging portion 23c formed as a protruding portion engages with the medial foot-side engaged portion 14c formed as a cutout portion provided as a hole portion. Thereby, the medial foot-side engaging portion 23c is sandwiched by the medial foot-side engaged portion 14c in the up-down direction intersecting the front-rear direction and the ground contact surface 12a.

Similarly, the lateral foot-side engaging portion 23d formed as a protruding portion engages with the lateral foot-side engaged portion 14d formed as a cutout portion provided as a hole portion. Thereby, the lateral foot-side engaging portion 23d is sandwiched by the lateral foot-side engaged portion 14d in the up-down direction intersecting the front-rear direction and the ground contact surface 12a.

Thus, the medial foot-side engaging portion 23c engages with the medial foot-side engaged portion 14c and the lateral foot-side engaging portion 23d engages with the lateral foot-side engaged portion 14d, with the result that the movement of the sole body 20 relative to the shell 10 in the thickness direction and the front-rear direction (i.e., the foot length direction of the wearer's foot) is limited. This also maintains the attached state in which the sole body 20 is attached to the shell 10.

By the configuration described above, the sole body 20 formed of a three-dimensional mesh structure body can be incorporated into the footwear 1A without using an adhesive.

In other words, in the footwear 1A according to the present embodiment, the sole body 20 is formed of a three-dimensional mesh structure body with numerous holes on the surface and inside to provide various functions such as flexibility and elasticity. Thus, in the case where the engaging portion 23 is provided in the shock absorbing portion 21a of the sole body 20 without taking any measures, the engaging portion 23 remains soft and has high deformability, which makes it difficult to firmly engage the engaging portion 23 with the engaged portion 14 corresponding thereto.

In this regard, in the footwear 1A according to the present embodiment, the occupied volume ratio of the region including at least the portion defining the engaging portion 23 in the shock absorbing portion 21a is locally increased as described above. Thus, this region is formed to be less flexible and less deformable than other portions. The configuration described above makes it possible to effectively suppress unintentional disconnection of the attached state of the sole body 20 caused when the engaging portion 23 is disengaged from the engaged portion 14 due to flexion or deformation of the engaging portion 23.

In the footwear 1A according to the present embodiment, the front-side engaged portion 14a and the rear-side engaged portion 14b are configured to be sandwiched by the front-side engaging portion 23a and the rear-side engaging portion 23b, respectively, as described above. By the configuration described above, the movement of the sole body 20 relative to the shell 10 in the up-down direction and the left-right direction can be limited, so that the attached state of the sole body 20 can be maintained.

Therefore, the footwear 1A according to the present embodiment makes it possible to implement footwear in which a sole body formed of a three-dimensional mesh structure body can be incorporated without using an adhesive.

In the footwear 1A according to the present embodiment, as described above, the engaged portion 14 of the outsole portion 11 extends in the peripheral direction of the inner side surface 13a of the peripheral wall portion 13, and the engaging portion 23 of the shock absorbing portion 21a extends in the peripheral direction of the peripheral surface 22 of the footbed portion 21.

By the configuration described above, the area of contact between the engaged portion 14 and the engaging portion 23 can be increased, so that the sole body 20 can be more firmly fixed to the shell 10.

In this case, in the footwear 1A according to the present embodiment, when the outer shape of one of the engaging portion and the engaged portion that is formed as a protruding portion is formed to be slightly larger than the outer shape of the space, into which the protruding portion is inserted, of the other one of the engaging portion and the engaged portion that is a cutout portion provided as a recessed portion or as a hole portion, then in the attached state, the engaging portion 23 of the shock absorbing portion 21a formed of an elastic body is to engage with the engaged portion 14 of the outsole portion 11 while being in pressure contact with the engaged portion 14. Therefore, the sole body 20 can be firmly fixed to the shell 10.

Further, when the outer shape of the sole body 20 in a plan view is formed to be slightly larger than the outer shape of the space defined by the base portion 12 and the peripheral wall portion 13 of the outsole portion 11, then in the attached state, the sole body 20 formed of an elastic body is to engage with the outsole portion 11 while being in pressure contact with the outsole portion 11 also in a portion other than the portion where the engaging portion 23 engages with the engaged portion 14. Therefore, the sole body 20 can be firmly fixed to the shell 10.

Further, in the footwear 1A according to the present embodiment, the engaging portions 23 are provided in the front side portion and the rear side portion of the footbed portion 21 as described above. Thereby, the engaging portion 23 engages with the engaged portion 14 in each of the front side portion and the rear side portion of the footwear 1A. By the configuration described above, the movement of the sole body 20 relative to the shell 10 in the up-down direction and the left-right direction can be limited more effectively than in the case where the engaging portion 23 engages with the engaged portion 14 only in one of the front side portion and the rear side portion of the footwear 1A. The attached state in which the sole body 20 is attached can be more stabled.

In the footwear 1A according to the present embodiment, as described above, the plurality of through holes 12c are provided in the base portion 12 of the outsole portion 11 and face a portion of the shock absorbing portion 21a that corresponds to the bottom surface of the footbed portion 21.

By the configuration described above, the plurality of through holes 12c are located below the shock absorbing portion 21a having excellent air permeability. Thus, the air retained between the base portion 12 of the outsole portion 11 and the wearers foot sole during use of the footwear 1A can be discharged not only from above the shock absorbing portion 21a but also from below the shock absorbing portion 21a, with the result that excellent air permeability during use of the footwear 1A can be ensured.

Further, as described above, the plurality of through holes 12c are provided in the portions located in the central portion in the foot width direction and corresponding to the ball portion and the heel portion of the wearer's foot, where air relatively tends to be retained during use of the footwear 1A. Thereby, the footwear 1A having excellent air permeability can be implemented.

The through holes 12c each can have a tapered shape that tapers from the inner side bottom surface 12b side toward the ground contact surface 12a side. The configuration described above makes it possible to effectively prevent intrusion of foreign substances from the ground contact surface 12a side.

In the footwear 1A according to the present embodiment, described above, the engaging portion 23 engages with the engaged portion 14 in each of the portions located on the medial foot side and the lateral foot side in a region extending over the boundary between the forefoot portion R1 and the midfoot portion R2 of the footwear 1A.

In these portions described above, a relatively large load tends to be applied when the wearer's foot steps on the footwear 1A, and thus, the sole body 20 tends to move relative to the shell 10. Accordingly, by engaging the engaging portion 23 with the engaged portion 14 in these portions, unintentional disconnection of the attached state of the sole body 20 can be effectively suppressed.

Further, in the region extending over the boundary between the forefoot portion R1 and the midfoot portion R2 in the footwear 1A, the portion located on the medial foot side and the portion located on the lateral foot side are located at one end and the other end, respectively, of the foot cover portion 15 of the shell 10. Thus, by providing the engaging portion 23 and the engaged portion 14 in these portions, a relatively large area of contact between the engaging portion 23 and the engaged portion 14 can be ensured, with the result that the sole body 20 can be more firmly fixed to the shell 10.

In the above description about the footwear 1A according to the present embodiment, the shock absorbing portion 21a in the region where the occupied volume ratio is locally increased is formed of a three-dimensional mesh structure body whose occupied volume ratio is 100%, but the shock absorbing portion 21a in the region where the occupied volume ratio is locally increased does not necessarily have to have an occupied volume ratio of 100%, and the occupied volume ratio of the shock absorbing portion 21a in the above-mentioned region can be, for example, 50% or more and 99% or less as long as it is higher than that in the surrounding area.

Further, the shock absorbing portion 21a in the region where the occupied volume ratio is locally increased does not necessarily have to have the same occupied volume ratio in the entire region, but can have different occupied volume ratios in the entire region. In this case, for example, by configuring the shock absorbing portion 21a in the above-mentioned region such that the occupied volume ratio gradually decreases toward the surrounding area, the wearer who wears the footwear 1A can feel less uncomfortable.

As a method of forming the sole body 20 to have different occupied volume ratios in each part, for example, it is conceivable to change the size of the unit structure in each part of the sole body 20, to change the thicknesses of the columns of the unit structure in each part of the sole body 20, or to change the structure of the unit structure in each part of the sole body 20.

Further, in the above description about the footwear 1A according to the present embodiment, the front-side engaged portion 14a and the rear-side engaged portion 14b of the outsole portion 11 are protruding portions while the front-side engaging portion 23a and the rear-side engaging portion 23b of the shock absorbing portion 21a are cutout portions provided as recessed portions, but the front-side engaging portion 23a and the rear-side engaging portion 23b can be protruding portions while the front-side engaged portion 14a and the rear-side engaged portion 14b can be cutout portions provided as recessed portions.

Further, in the above description about the footwear 1A according to the present embodiment, the medial foot-side engaged portion 14c and the lateral foot-side engaged portion 14d of the outsole portion 11 are cutout portions formed as hole portions while the medial foot-side engaging portion 23c and the lateral foot-side engaging portion 23d of the shock absorbing portion 21a are protruding portions, but the medial foot-side engaging portion 23c and the lateral foot-side engaging portion 23d can be cutout portions provided as recessed portions while the medial foot-side engaged portion 14c and the lateral foot-side engaged portion 14d can be protruding portions.

Further, in the above description about the footwear 1A according to the present embodiment, the engaging portion 23 engages with the engaged portion 14 in each of the front side portion and the rear side portion of the footwear 1A, but the engaging portion 23 can extend over the entire periphery in the peripheral direction of the peripheral surface 22 of the footbed portion 21 and the engaged portion 14 can extend over the entire periphery in the peripheral direction of the inner side surface 13a of the peripheral wall portion 13, and thus, the engaging portion 23 and the engaged portion 14 can engage with each other over the entire periphery of the footwear 1A.

Further, in the above description about the footwear 1A according to the present embodiment, the front-side engaged portion 14a and the rear-side engaged portion 14b are protruding portions extending in the peripheral direction of the inner side surface 13a while the front-side engaging portion 23a and the rear-side engaging portion 23b are recessed portions extending in the peripheral direction of the peripheral surface 22, but the front-side engaged portion 14a and the rear-side engaged portion 14b can be protruding portions provided in spots in the inner side surface 13a while the front-side engaging portion 23a and the rear-side engaging portion 23b can be formed as recessed portions provided in spots in the peripheral surface 22.

First Modification

Figure 13:
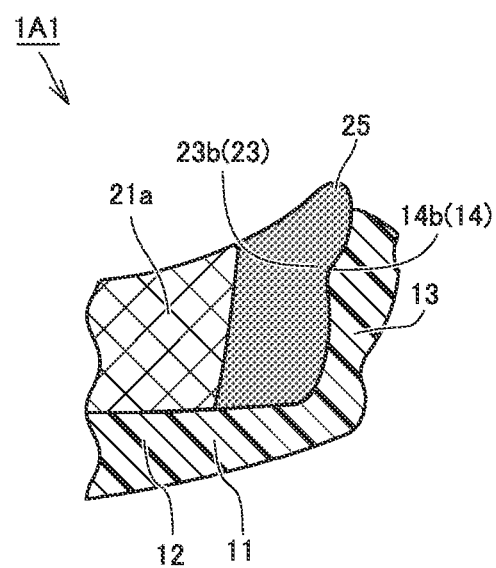
FIG. 13 is a main-part enlarged cross-sectional view of footwear according to a first modification.

FIG. 13 is a main-part enlarged cross-sectional view showing a rear-side engaged portion and the vicinity thereof in footwear according to the first modification. Referring to FIG. 13, the following describes footwear 1A1 according to the first modification based on the above-described first embodiment.

As shown in FIG. 13, the footwear 1A1 according to the first modification is different from the footwear 1A according to the above-described first embodiment in the solid region in the vicinity of the rear-side engaging portion 23b of the shock absorbing portion 21a.

More specifically, in the footwear 1A1 according to the first modification, the occupied volume ratio is locally increased in the region of the shock absorbing portion 21a that includes the portion defining the rear-side engaging portion 23b together with the inner portion adjacent thereto. Although not shown herein, the above-described configuration is the same also in the front-side engaging portion 23a.

Also in the configuration described above, the same effect as that described in the above first embodiment can be achieved, which makes it possible to implement footwear in which a sole body formed of a three-dimensional mesh structure body can be incorporated without using an adhesive.

In the footwear 1A1 according to the present modification, in the entire area of the region including the portion defining the rear-side engaging portion 23b and the inner portion adjacent thereto in the shock absorbing portion 21a, the occupied volume ratio is assumed to be the same but can be different. In this case, for example, the shock absorbing portion 21a can be configured such that its occupied volume ratio gradually decreases from the portion defining the rear-side engaging portion 23b toward the inner portion adjacent thereto in the shock absorbing portion 21a. The configuration described above makes it possible to reduce the uncomfortability that the wearer feels when wearing the footwear 1A1.

Second Modification

Figure 14A:
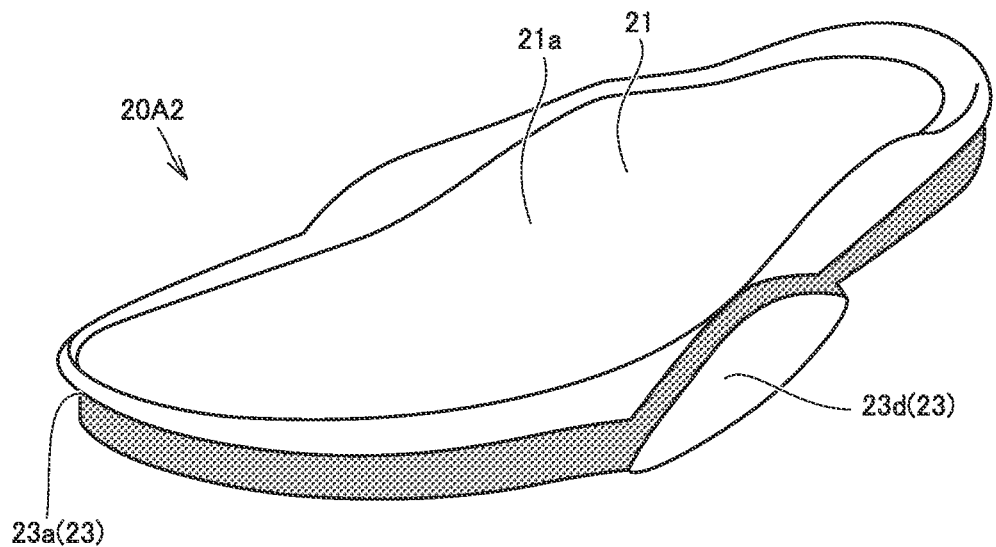
FIGS. 14A and 14B each are a perspective view illustrating a region of a sole body according to a second modification in which an occupied volume ratio is locally increased.
Figure 14B:
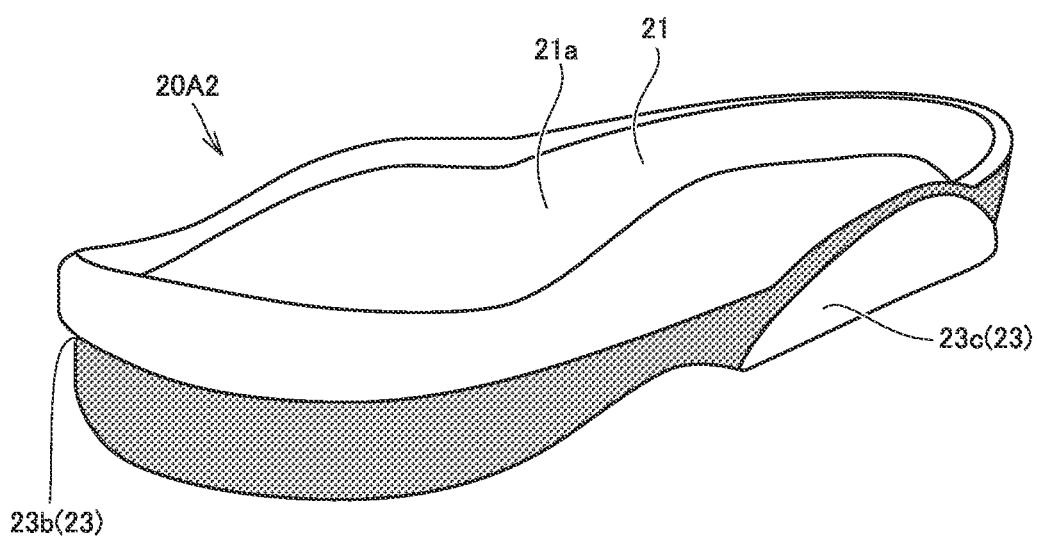

FIGS. 14A and 14B each are a perspective view illustrating a region of a sole body according to the second modification where its occupied volume ratio is locally increased. FIG. 14A is a perspective view of the sole body as viewed obliquely from the upper right front side and FIG. 14B is a perspective view of the sole body as viewed obliquely from the lower left rear side. Referring to FIGS. 14A and 14B, the following describes a sole body 20A2 used in footwear according to the second modification based on the above-described first embodiment. Note that FIGS. 14A and 14B each show a simplified configuration of the sole body (the same also applies to FIGS. 15A, 15B, 18A to 18E, and 19A to 19F, which will be described later).

As shown in FIGS. 14A and 14B, the sole body 20A2 used in the footwear according to the second modification is different in the solid region of the shock absorbing portion 21a from the sole body 20 used in the footwear 1A according to the above-described first embodiment.

More specifically, in the sole body 20A2, the solid region of the shock absorbing portion 21a is disposed not only in the front-side engaging portion 23a and the rear-side engaging portion 23b but also over the entire periphery in a portion of the peripheral surface 22 of the footbed portion 21 that is located below the recessed portion defining each of the front-side engaging portion 23a and the rear-side engaging portion 23b.

Also in the configuration described above, the same effect as that described in the above first embodiment can be achieved, which makes it possible to implement footwear in which a sole body formed of a three-dimensional mesh structure body can be incorporated without using an adhesive.

Further, by the configuration described above, a solid region that is less flexible and less deformable is disposed in the lower portion of the peripheral surface 22 that is covered by the inner side surface 13a of the peripheral wall portion 13 of the outsole portion 11 in the attached state. Thereby, the engaged portion 14 and the engaging portion 23 more firmly engage with each other, which makes it possible to effectively prevent the footbed portion 21 from being unintentionally deformed and detached upward during wearing of the footwear.

In the sole body 20A2 according to the present modification, the solid region of the shock absorbing portion 21a is disposed over the entire periphery of the peripheral surface 22 of the footbed portion 21, but the solid region does not necessarily have to be disposed over the entire periphery. In other words, the solid region can be disposed only in a portion of the peripheral surface 22 that corresponds to the front-side engaging portion 23a in the peripheral direction, or can be disposed only in a portion of the peripheral surface 22 that corresponds to the rear-side engaging portion 23b in the peripheral direction. By minimizing the region in which the solid region is provided in this way, the sole body 20A2 can be reduced in weight, and also, the washing process and the like after the three-dimensional additive manufacturing process for the sole body 20A2 can be optimized.

Third Modification

Figure 15A:
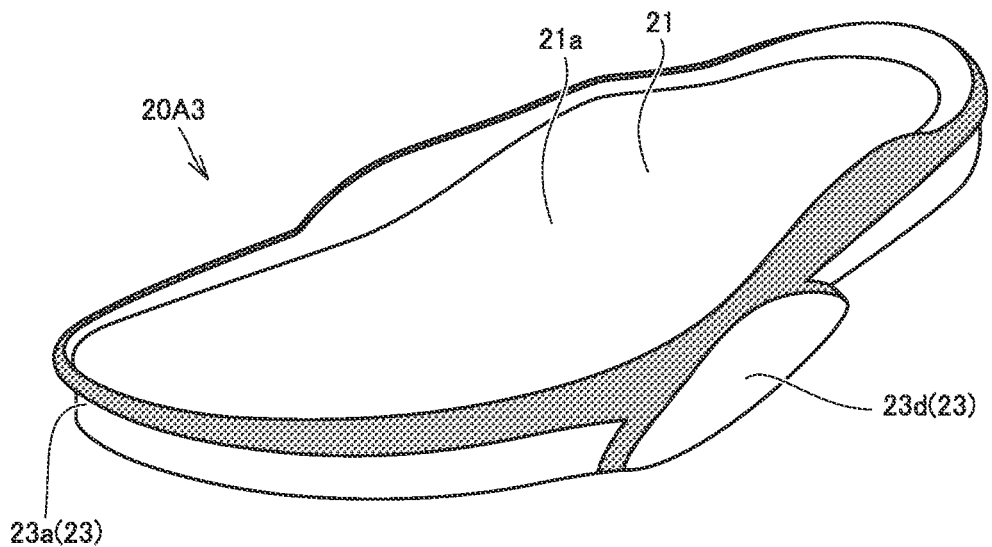
FIGS. 15A and 15B each are a perspective view illustrating a region of a sole body according to a third modification in which an occupied volume ratio is locally increased.
Figure 15B:
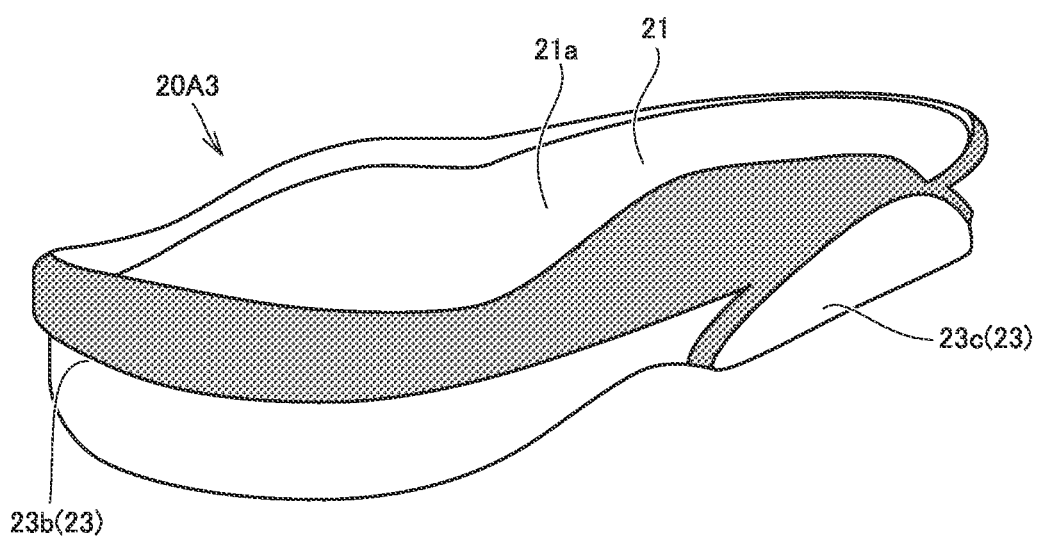

FIGS. 15A and 15B each are a perspective view illustrating a region of a sole body according to the third modification where the occupied volume ratio is locally increased. FIG. 15A is a perspective view of the sole body as viewed obliquely from the upper right front side, and FIG. 15B is a perspective view of the sole body as viewed obliquely from the lower left rear side. Referring to FIGS. 15A and 15B, the following describes a sole body 20A3 used in footwear according to the third modification based on the above-described first embodiment.

As shown in FIGS. 15A and 15B, the sole body 20A3 used in the footwear according to the third modification is different in the solid region of the shock absorbing portion 21a from the sole body 20 used in the footwear 1A according to the above-described first embodiment.

More specifically, in the sole body 20A3, the solid region of the shock absorbing portion 21a is disposed not only in the front-side engaging portion 23a and the rear-side engaging portion 23b but also over the entire periphery in a portion of the peripheral surface 22 of the footbed portion 21 that is located above the recessed portion defining each of the front-side engaging portion 23a and the rear-side engaging portion 23b.

Also in the configuration described above, the same effect as that described in the above first embodiment can be achieved, which makes it possible to implement footwear in which a sole body formed of a three-dimensional mesh structure body can be incorporated without using an adhesive.

Further, by the configuration described above, the solid region that is less flexible and less deformable is disposed in the upper portion of the peripheral surface 22 where a load tends to concentrate while the wearer is walking, and thereby, the durability of the sole body can be dramatically improved.

Further, by the configuration described above, the top surface of the footbed portion 21 can be prevented from deforming when the wearer's foot steps on the ground. Thereby, the engaged portion 14 and the engaging portion 23 more firmly engage with each other, which makes it possible to effectively prevent the footbed portion 21 from being unintentionally deformed and detached upward during wearing of the footwear.

In the sole body 20A3 according to the present modification, the solid region of the shock absorbing portion 21a is disposed over the entire periphery of the peripheral surface 22 of the footbed portion 21, but the solid region does not necessarily have to be provided over the entire periphery. In other words, the solid region can be disposed only in a portion of the peripheral surface 22 that corresponds to the front-side engaging portion 23a in the peripheral direction, or can be disposed only in a portion of the peripheral surface 22 that corresponds to the rear-side engaging portion 23b in the peripheral direction. By minimizing the region in which the solid region is provided in this way, the sole body 20A3 can be reduced in weight, and also, the washing process and the like after the three-dimensional additive manufacturing process for the sole body 20A3 can be optimized.

Fourth to Eleventh Modifications

FIG. 16A to FIG. 16H each are a main-part enlarged cross-sectional view showing a rear-side engaged portion and the vicinity thereof in footwear according to each of the fourth to eleventh modifications. Referring to FIGS. 16A to 16H, the following describes footwear 1A4 to footwear 1A11 according to the fourth to eleventh modifications based on the above-described first embodiment.

As shown in FIGS. 16A to 16H, the footwear 1A4 to the footwear 1A11 according to the fourth to eleventh modifications based on the first embodiment are different from the footwear 1A according to the above-described first embodiment in the shape of a portion of the peripheral wall portion 13 of the outsole portion 11 that is located in the vicinity of the rear-side engaged portion 14b and the shape of a portion of the shock absorbing portion 21a that is located in the vicinity of the rear-side engaging portion 23b. Further, in the footwear 1A4 to the footwear 1A11, a solid region corresponds to a region of the shock absorbing portion 21a that includes the portion defining the rear-side engaging portion 23b and the portions located thereabove and therebelow. Although not shown herein, the above-described configuration is the same also in the front-side engaged portion 14a and the front-side engaging portion 23a.

Figure 16A:
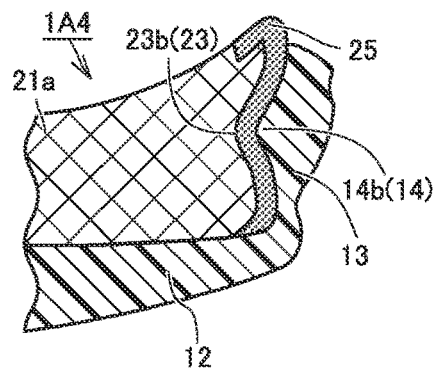
FIGS. 16A to 16H each are a main-part enlarged cross-sectional view of footwear according to each of fourth to eleventh modifications.

As shown in FIG. 16A, in the footwear 1A4 according to the fourth modification, the rear-side engaged portion 14b has a protruding portion substantially in a central portion of the inner side surface 13a of the peripheral wall portion 13 in the up-down direction. Further, the rear-side engaging portion 23b has a recessed portion at a position corresponding to the position of the protruding portion.

Figure 16E:
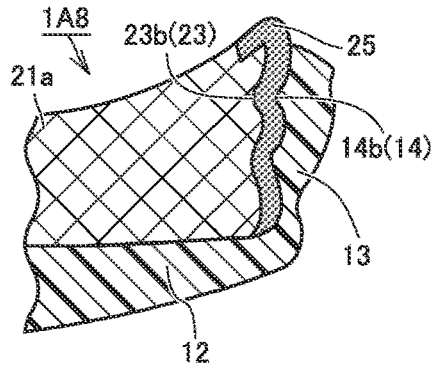
Figure 16B:
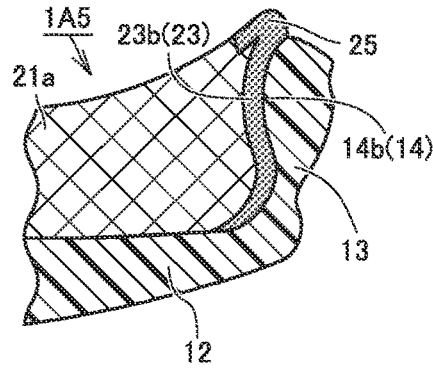

As shown in FIG. 16B, in the footwear 1A5 according to the fifth modification, the rear-side engaged portion 14b has a protruding portion in a portion between substantially a central portion and an upper end portion of the inner side surface 13a in the up-down direction. Further, the rear-side engaging portion 23b has a recessed portion at a position corresponding to the position of the protruding portion.

Figure 16F:
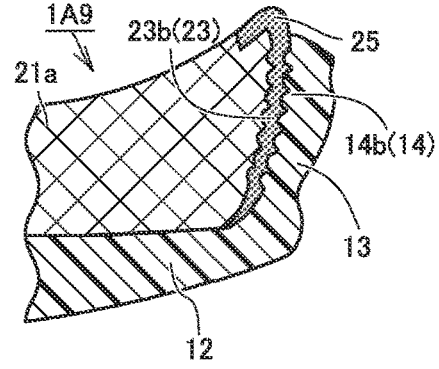
Figure 16C:
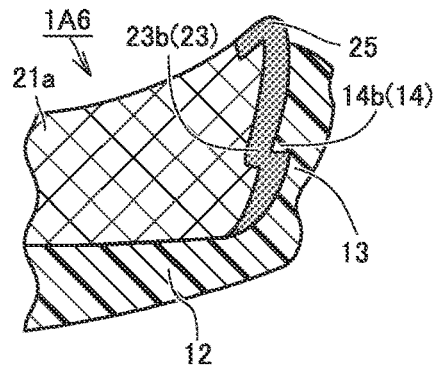

As shown in FIG. 16C, in the footwear 1A6 according to the sixth modification, the rear-side engaged portion 14b has a protruding portion that locally protrudes substantially in a central portion of the inner side surface 13a in the up-down direction. Further, the rear-side engaging portion 23b has a recessed portion locally recessed at a position corresponding to the position of the protruding portion.

Figure 16G:
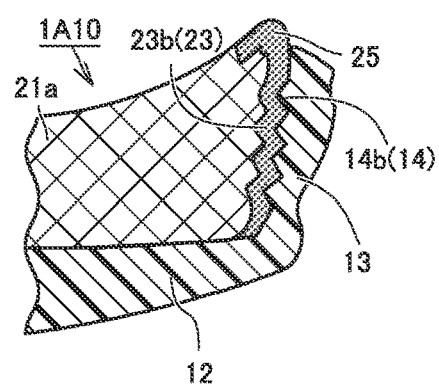
Figure 16D:
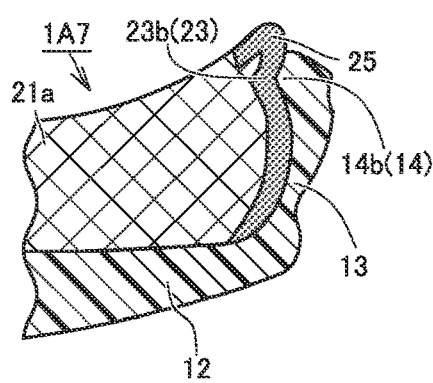

As shown in FIG. 16D, in the footwear 1 A7 according to the seventh modification, the rear-side engaged portion 14b has a protruding portion at an upper end portion of the inner side surface 13a. Further, the rear-side engaging portion 23b has a recessed portion at a position corresponding to the position of the protruding portion.

As shown in FIG. 16E, in the footwear 1A8 according to the eighth modification, the rear-side engaged portion 14b has two protruding portions arranged side by side in the up-down direction. Further, the rear-side engaging portion 23b has two recessed portions disposed so as to correspond to the two protruding portions.

Also in the configurations as in the footwear 1A4 to the footwear 1A8 according to the fourth to eighth modifications, the same effect as that described in the above first embodiment can be achieved, which makes it possible to implement footwear in which a sole body formed of a three-dimensional mesh structure body can be incorporated without using an adhesive.

Further, in each of the footwear 1A4 to the footwear 1A8 according to the fourth to eighth modifications, the portion of the solid region that is located below the rear-side engaging portion 23b is located rearward of the portion of the solid region that defines the rear-side engaging portion 23b in the front-rear direction of each of the footwear 1A4 to the footwear 1A8.

Thereby, the portion of the solid region that is located below the rear-side engaging portion 23b is sandwiched in the up-down direction between the rear-side engaged portion 14b of the peripheral wall portion 13 and the base portion 12 of the outsole portion 11, which makes it possible to effectively prevent the footbed portion 21 from being unintentionally deformed and detached upward during wearing of the footwear.

As shown in FIG. 16F, in the footwear 1A9 according to the ninth modification, the rear-side engaged portion 14b has a plurality of protruding portions formed continuously in the up-down direction in the inner side surface 13a of the peripheral wall portion 13. The rear-side engaging portion 23b has a plurality of recessed portions at positions corresponding to the positions of the plurality of protruding portions.

As shown in FIG. 16G, in the footwear 1A10 according to the tenth modification, the rear-side engaged portion 14b and the rear-side engaging portion 23b each have a zigzag shape with obtuse angles.

Figure 16H:
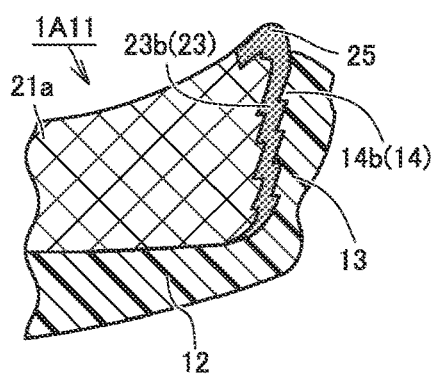

As shown in FIG. 16H, in the footwear 1A11 according to the eleventh modification, the rear-side engaged portion 14b and the rear-side engaging portion 23b each have a zigzag shape with acute angles.

Also in the configurations as in the footwear 1A8 to the footwear 1A11 according to the eighth to eleventh modifications, the same effect as that described in the above first embodiment can be achieved, which makes it possible to implement footwear in which a sole body formed of a three-dimensional mesh structure body can be incorporated without using an adhesive.

Twelfth to Eighteenth Modifications

FIG. 17A to FIG. 17G each are a main-part enlarged cross-sectional view showing a rear-side engaged portion and the vicinity thereof in footwear according to each of the twelfth to eighteenth modifications. Referring to FIGS. 17A to 17G, the following describes footwear 1A12 to footwear 1A18 according to the twelfth to eighteenth modifications based on the above-described first embodiment.

As shown in FIGS. 17A to 17G, the footwear 1A12 to the footwear 1A18 according to the twelfth to eighteenth modifications based on the first embodiment are different from the footwear 1A according to the above-described first embodiment in the shape of the portion in the vicinity of the rear-side engaged portion 14b and the shape of the portion in the vicinity of the rear-side engaging portion 23b. In the footwear 1A12 to the footwear 1A18, a solid region corresponds to the region of the shock absorbing portion 21a that includes the portion defining the rear-side engaging portion 23b and the portions located thereabove and therebelow. Although not shown herein, the above-described configuration is the same also in the front-side engaged portion 14a and the front-side engaging portion 23a.

Figure 17A:
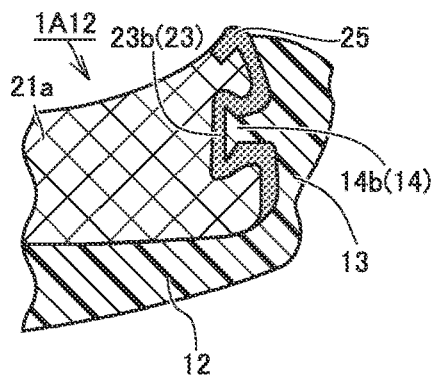
FIGS. 17A to 17G each are a main-part enlarged cross-sectional view of footwear according to each of twelfth to eighteenth modifications.

As shown in FIG. 17A, in the footwear 1A12 according to the twelfth modification, a protruding portion of the rear-side engaged portion 14b includes a root portion and a top portion. When viewed in the peripheral direction of the peripheral wall portion 13, the root portion has a rectangular cross-sectional shape and the top portion has a trapezoidal cross-sectional shape in which the dimension in the up-down direction increases from the rear side to the front side of the footwear 1A12. Further, the rear-side engaging portion 23b has a recessed portion having a shape capable of holding the protruding portion having the above-described shape in the up-down direction.

Figure 17E:
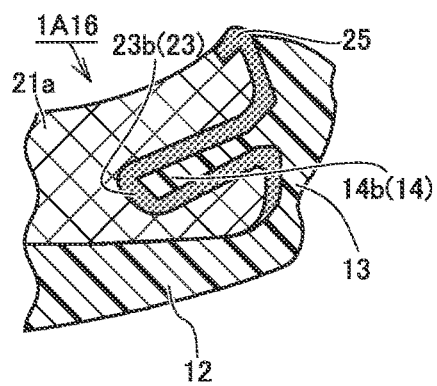
Figure 17B:
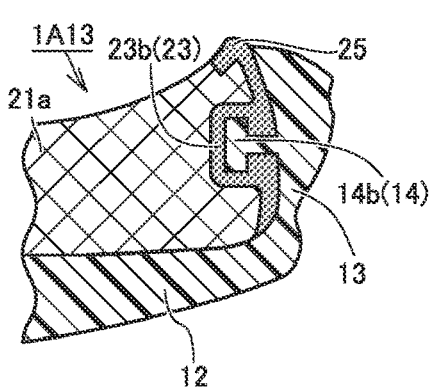

As shown in FIG. 17B, in the footwear 1A13 according to the thirteenth modification, a protruding portion of the rear-side engaged portion 14b includes a root portion and a top portion. When viewed in the peripheral direction of the peripheral wall portion 13, the root portion and the top portion each have a rectangular cross-sectional shape, and the top portion is formed to be larger than the root portion in the up-down direction. Further, the rear-side engaging portion 23b has a recessed portion having a shape capable of holding the protruding portion having the above-described shape in the up-down direction.

Figure 17F:
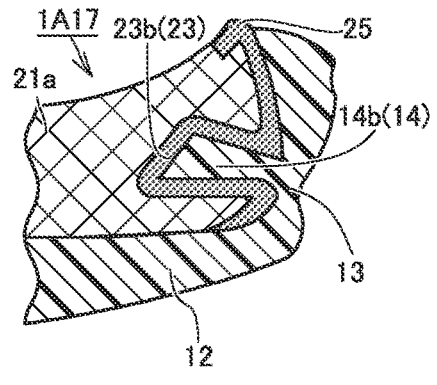
Figure 17C:
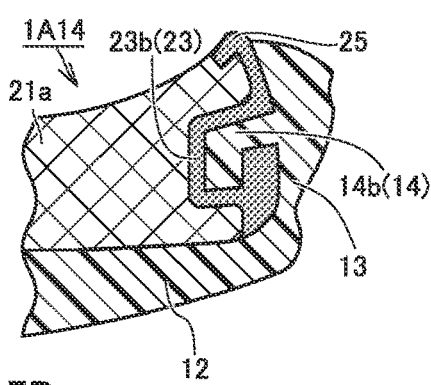

As shown in FIG. 17C, in the footwear 1A14 according to the fourteenth modification, a protruding portion of the rear-side engaged portion 14b includes a root portion and a top portion. When viewed in the peripheral direction of the peripheral wall portion 13, the top portion is shaped to protrude downward from a part of the root portion on the top portion side.

Figure 17G:
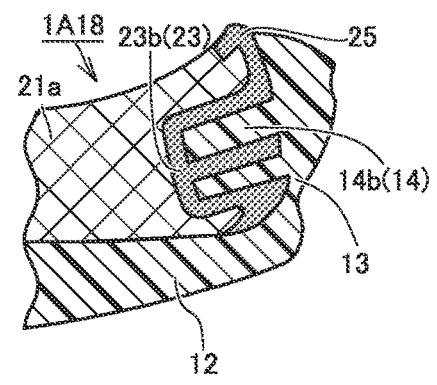
Figure 17D:
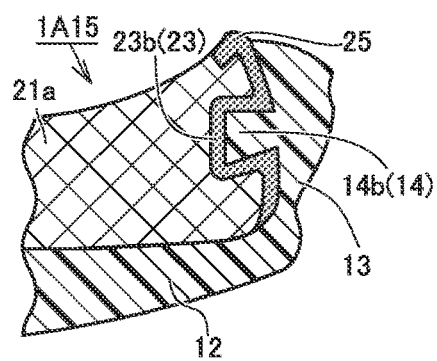

As shown in FIG. 17D, in the footwear 1A15 according to the fifteenth modification, when viewed in the peripheral direction of the peripheral wall portion 13, the protruding portion of the rear-side engaged portion 14b has a trapezoid cross-sectional shape in which the dimension in the up-down direction increases from the rear side to the front side of the footwear 1A15. Further, the rear-side engaging portion 23b has a recessed portion having a shape capable of holding the protruding portion in the up-down direction.

As shown in FIG. 17E, in the footwear 1A16 according to the sixteenth modification, when viewed in the peripheral direction of the peripheral wall portion 13, the rear-side engaged portion 14b has a protruding portion protruding downward from the rear end side to the front end side of the footwear 1A16. Further, the rear-side engaging portion 23b has a recessed portion having a shape capable of holding the protruding portion in the up-down direction.

As shown in FIG. 17F, in the footwear 1A17 according to the seventeenth modification, when viewed in the peripheral direction of the peripheral wall portion 13, the rear-side engaged portion 14b has two protruding portions protruding downward from the rear end side to the front end side of the footwear 1A17. Further, the rear-side engaging portion 23b has two recessed portions each having a shape capable of holding the corresponding one of the two protruding portions in the up-down direction.

As shown in FIG. 17G, in the footwear 1A18 according to the eighteenth modification, when viewed in the peripheral direction of the peripheral wall portion 13, a protruding portion of the rear-side engaged portion 14b protrudes upward from the rear end side to the front end side of the footwear 1A18. Further, the rear-side engaging portion 23b has a recessed portion having a shape capable of holding the protruding portion in the up-down direction.

Also in the configurations as in the footwear 1A12 to the footwear 1A18 according to the twelfth to eighteenth modifications, the same effect as that described in the above first embodiment can be achieved, which makes it possible to implement footwear in which a sole body formed of a three-dimensional mesh structure body can be incorporated without using an adhesive.

Further, each of the footwear 1A12 to the footwear 1A15 according to the twelfth to fifteenth modifications can implement what is called a fixedly fitted state in which the rear-side engaging portion 23b is not easily detached from the rear-side engaged portion 14b in the attached state.

Although no description is provided herein, the above-described configuration can be applied to the rear-side engaged portion 14b formed as a recessed portion and the rear-side engaging portion 23b formed as a protruding portion.

Nineteenth to Twenty-Third Modifications

FIGS. 18A to 18E each are a main-part enlarged perspective view showing a portion in the vicinity of a rear-side engaging portion in a sole body used in footwear according to each of the nineteenth to twenty-third modifications. Referring to FIGS. 18A to 18E, the following describes sole bodies 20A19 to 20A23 each used in footwear according to each of the nineteenth to twenty-third modifications based on the above-described first embodiment.

As shown in FIGS. 18A to 18E, the sole bodies 20A19 to 20A23 each used in the footwear according to each of the nineteenth to twenty-third modifications based on the first embodiment are different in the configuration of the rear-side engaging portion 23b of the shock absorbing portion 21a from the sole body 20 used in the footwear 1A according to the first embodiment. Although not shown herein, the protruding portion forming the rear-side engaged portion 14b has a shape capable of engaging with the rear-side engaging portion 23b (described below).

Figure 18A:
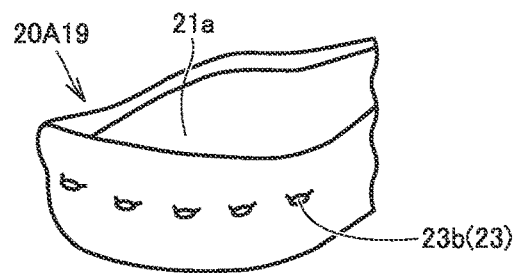
FIGS. 18A to 18E each are a schematic view of a sole body according to each of nineteenth to twenty-third modifications.

As shown in FIG. 18A, in the sole body 20A19 used in the footwear according to the nineteenth modification, the rear-side engaging portions 23b are formed as a plurality of recessed portions each having a truncated conical shape that are provided in a dotted manner in the peripheral direction of the peripheral surface 22 of the footbed portion 21.

Figure 18B:
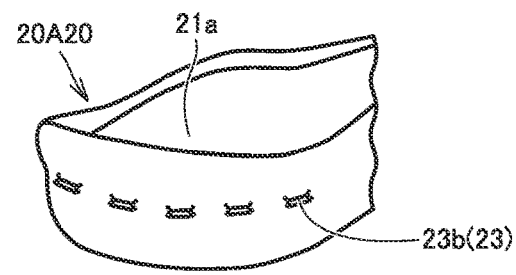

As shown in FIG. 18B, in the sole body 20A20 used in the footwear according to the twentieth modification, the rear-side engaging portions 23b are a plurality of recessed portions each having a truncated quadrangular pyramid shape that are provided in a dotted manner in the peripheral direction of the peripheral surface 22 of the footbed portion 21.

Figure 18C:
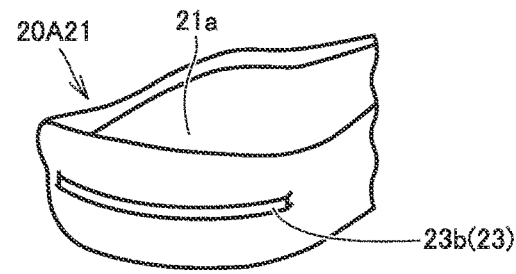

As shown in FIG. 18C, in the sole body 20A21 used in the footwear according to the twenty-first modification, the rear-side engaging portion 23b is one recessed portion having a truncated quadrangular pyramid shape extending in the peripheral direction of the peripheral surface 22 of the footbed portion 21.

Figure 18D:
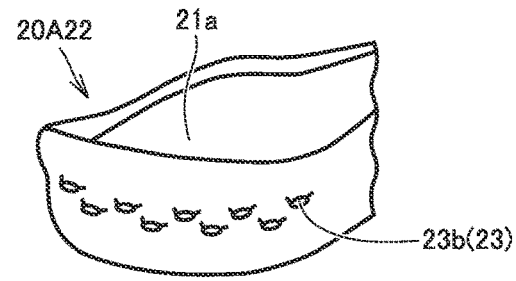

As shown in FIG. 18D, in the sole body 20A22 used in the footwear according to the twenty-second modification, the rear-side engaging portions 23b are a plurality of recessed portions each having a truncated conical shape that are arranged in a staggered manner in the peripheral direction of the peripheral surface 22 of the footbed portion 21.

Figure 18E:
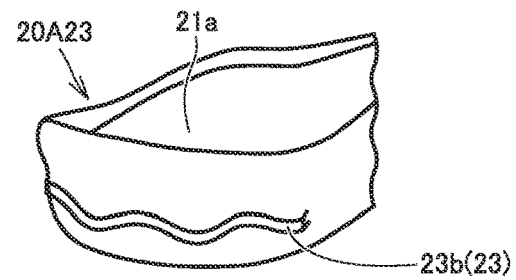

As shown in FIG. 18E, in the sole body 20A23 used in the footwear according to the twenty-third modification, the rear-side engaging portion 23b is one recessed portion having a truncated quadrangular pyramid shape extending in a wavy shape in the peripheral direction of the peripheral surface 22 of the footbed portion 21.

Although no description is provided herein, the above-described configuration can be applied to the rear-side engaged portion 14b formed as a recessed portion and the rear-side engaging portion 23b formed as a protruding portion.

Although no description is provided herein, the above-described configuration is the same also in the front-side engaged portion 14a and the front-side engaging portion 23a.

Also in the configuration as in the footwear according to each of the nineteenth to twenty-third modifications, the same effect as that described in the above first embodiment can be achieved, which makes it possible to implement footwear in which a sole body formed of a three-dimensional mesh structure body can be incorporated without using an adhesive.

Twenty-Fourth to Twenty-Ninth Modifications

FIGS. 19A to 19F each are a main-part enlarged rear view showing a portion in the vicinity of a rear-side engaging portion in a sole body used in footwear according to each of the twenty-fourth to twenty-ninth modifications. Referring to FIGS. 19A to 19F, the following describes sole bodies 20A24 to 20A29 each used in the footwear according to each of the twenty-fourth to twenty-ninth modifications based on the above-described first embodiment.

As shown in FIGS. 19A to 19F, the sole bodies 20A24 to 20A29 each used in the footwear according to each of the twenty-fourth to twenty-ninth modifications based on the first embodiment are different in the configuration of the rear-side engaging portion 23b of the shock absorbing portion 21a from the sole body 20 used in the footwear 1A according to the above-described first embodiment. Although not shown herein, the protruding portion forming the rear-side engaged portion 14b has a shape capable of engaging with the rear-side engaging portion 23b (described below).

Figure 19A:
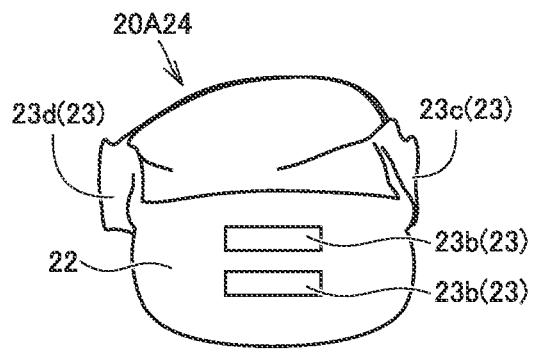
FIGS. 19A to 19F each are a schematic view of a sole body according to each of twenty-fourth to twenty-ninth modifications.

As shown in FIG. 19A, in the sole body 20A24 used in the footwear according to the twenty-fourth modification, the rear-side engaging portions 23b are formed as two recessed portions each extending in the peripheral direction of the peripheral surface 22 of the footbed portion 21. These two recessed portions are arranged side by side in the up-down direction.

Figure 19D:
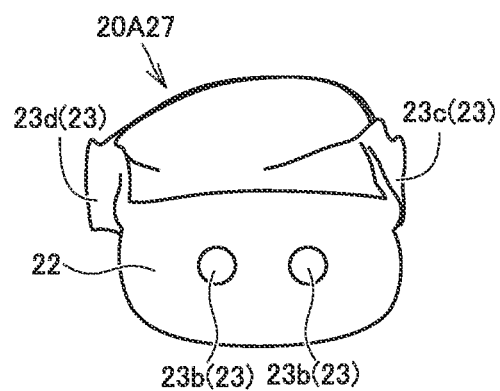
Figure 19B:
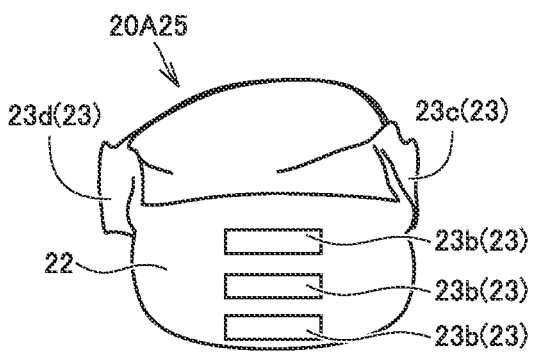

As shown in FIG. 19B, in the sole body 20A25 used in the footwear according to the twenty-fifth modification, the rear-side engaging portions 23b are formed as three recessed portions each extending in the peripheral direction of the peripheral surface 22 of the footbed portion 21. These three recessed portions are arranged side by side in the up-down direction.

Figure 19E:
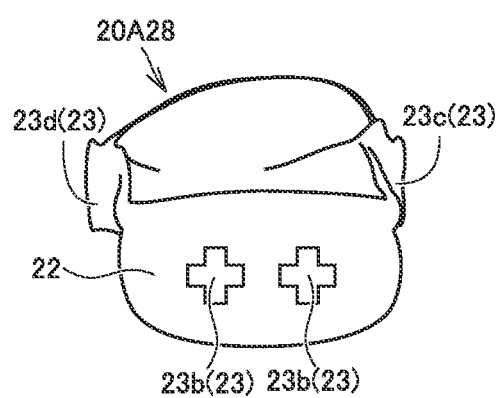
Figure 19C:
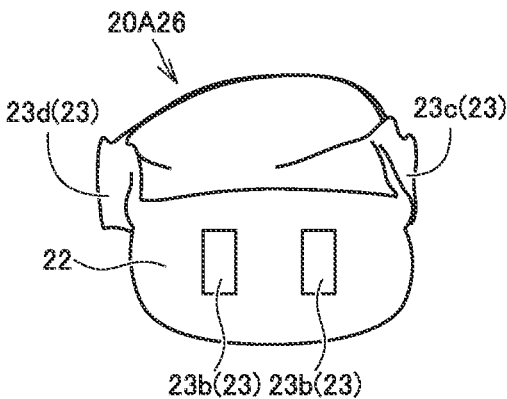

As shown in FIG. 19C, in the sole body 20A26 used in the footwear according to the twenty-sixth modification, the rear-side engaging portions 23b are formed as two recessed portions each extending in the up-down direction. These two recessed portions are arranged side by side in the peripheral direction of the peripheral surface 22 of the footbed portion 21.

As shown in FIG. 19D, in the sole body 20A27 used in the footwear according to the twenty-seventh modification, the rear-side engaging portions 23b are formed as two recessed portions each having a substantially disk-like shape. These two recessed portions are arranged side by side in the peripheral direction of the peripheral surface 22 of the footbed portion 21.

As shown in FIG. 19E, in the sole body 20A28 used in the footwear according to the twenty-eighth modification, the rear-side engaging portions 23b are formed as two recessed portions each having a cross shape. These two recessed portions are arranged side by side in the peripheral direction of the peripheral surface 22 of the footbed portion 21.

Figure 19F:
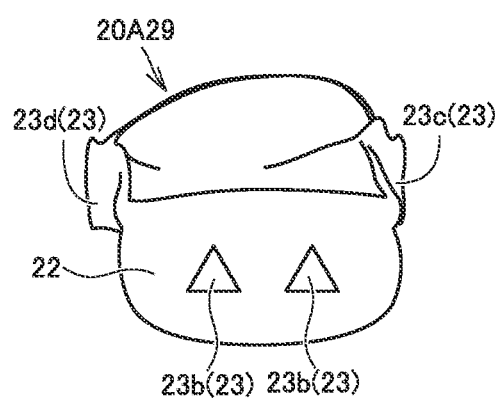

As shown in FIG. 19F, in the sole body 20A29 used in the footwear according to the twenty-ninth modification, the rear-side engaging portions 23b are formed as two recessed portions each having a triangular shape. These two recessed portions are arranged side by side in the peripheral direction of the peripheral surface 22 of the footbed portion 21.

Although no description is provided herein, the above-described configuration can be applied to the rear-side engaged portion 14b formed as a recessed portion and the rear-side engaging portion 23b formed as a protruding portion.

Although no description is provided herein, the above-described configuration is the same also in the front-side engaged portion 14a and the front-side engaging portion 23a.

Also in the configuration as in the footwear according to each of the twenty-fourth to twenty-ninth modifications, the same effect as that described in the above first embodiment can be achieved, which makes it possible to implement footwear in which a sole body formed of a three-dimensional mesh structure body can be incorporated without using an adhesive.

Thirtieth Modification

Figure 20:
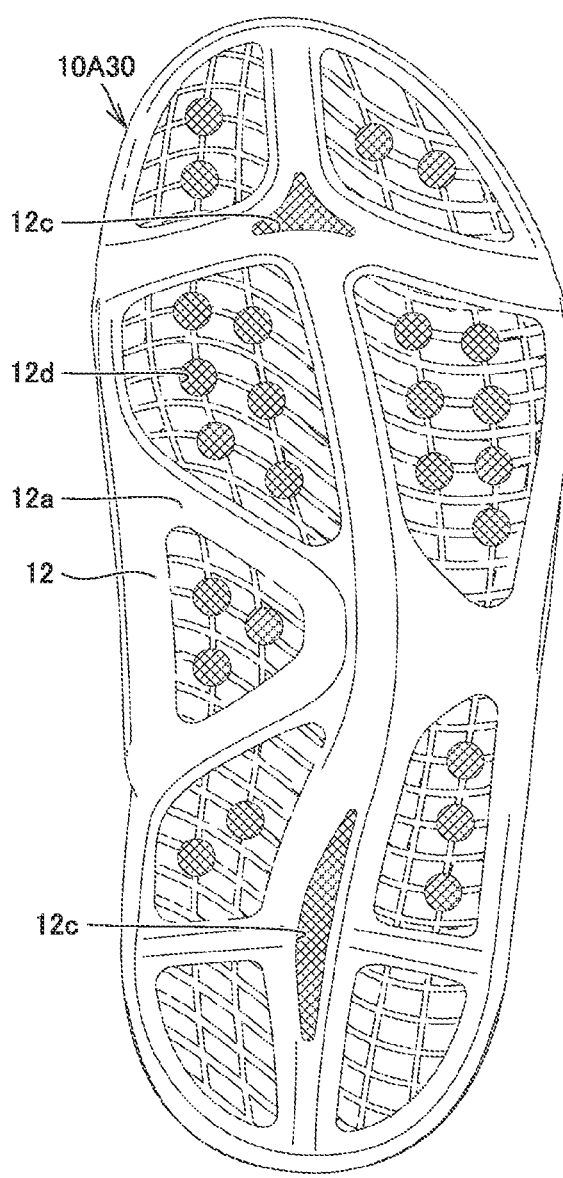
FIG. 20 is a bottom view of footwear according to a thirtieth modification.

FIG. 20 is a bottom view of footwear according to the thirtieth modification. Referring to FIG. 20, the following describes a shell 10A30 used in footwear 1A30 according to the thirtieth modification based on the above-described first embodiment.

As shown in FIG. 20, the shell 10A30 used in the footwear 1A30 according to the thirtieth modification based on the first embodiment is different in the configuration of the base portion 12 from the shell 10 used in the footwear 1A according to the first embodiment.

More specifically, in the shell 10A30 used in the footwear 1A30 according to the thirtieth modification, the base portion 12 further includes a plurality of auxiliary through holes 12d in addition to the above-described plurality of through holes 12c.

Similarly to the plurality of through holes 12c, the plurality of auxiliary through holes 12d are disposed in the base portion 12 so as to extend to a portion defining the ground contact surface 12a of the base portion 12 and a portion defining the inner side bottom surface 12b. The plurality of auxiliary through holes 12d are arranged in a dotted manner over the entire surface of the base portion 12.

Also in the configuration described above, the same effect as that described in the above first embodiment can be achieved, which makes it possible to implement footwear in which a sole body formed of a three-dimensional mesh structure body can be incorporated without using an adhesive.

Further, by the configuration described above, excellent air permeability can be ensured during use of the footwear.

Second Embodiment

Figure 21:
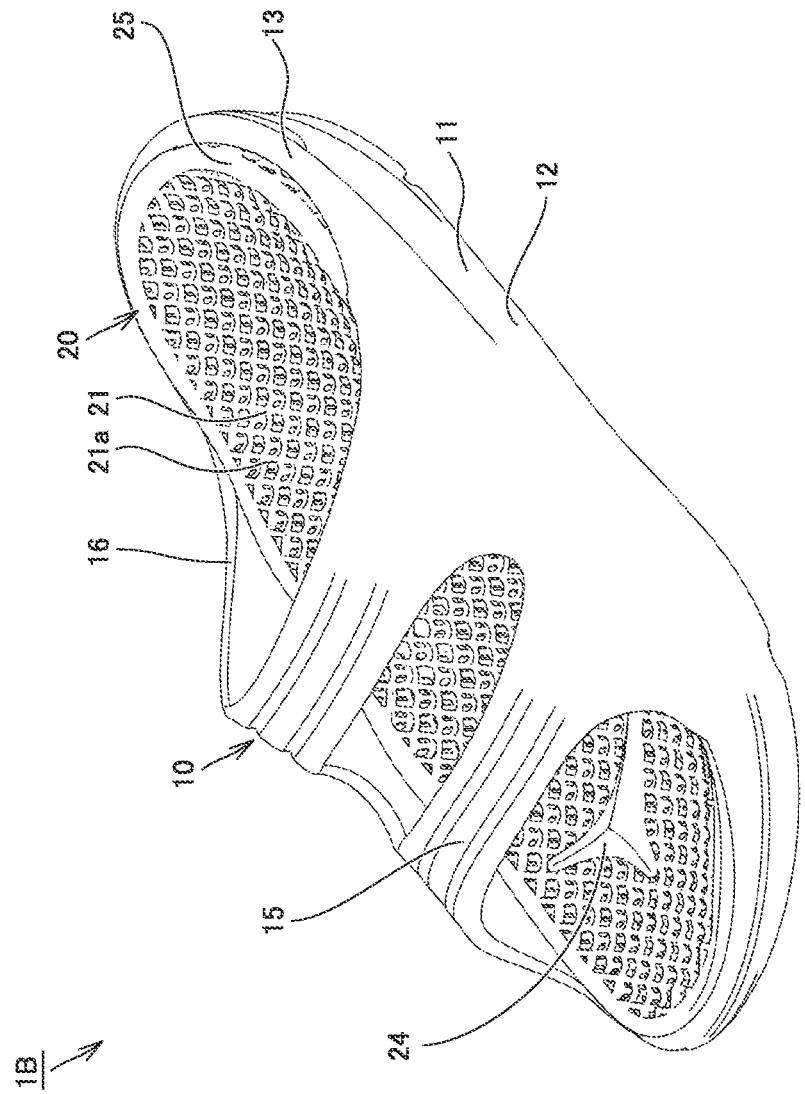
FIG. 21 is a perspective view of footwear according to a second embodiment.

FIG. 21 is a perspective view of footwear according to the second embodiment as viewed obliquely from the upper right front side. Referring to FIG. 21, the following describes footwear 1B according to the present embodiment.

As shown in FIG. 21, the footwear 1B according to the present embodiment is different from the footwear 1A according to the above-described first embodiment in that the medial foot-side engaged portion 14c and the lateral foot-side engaged portion 14d are not disposed in the outsole portion 11, and accordingly, the medial foot-side engaging portion 23c and the lateral foot-side engaging portion 23d are not disposed in the shock absorbing portion 21a.

Also in the configuration described above, the same effect as that described in the above first embodiment can be achieved.

Supplementary Notes

The following summarizes the characteristic configurations of the footwear disclosed in the above-described embodiments and their modifications.

Supplementary Note 1

Footwear comprising:
a shell including at least an outsole portion with a ground contact surface and a foot cover portion that covers an instep of a foot of a wearer; and
a sole body that is detachably attached to the shell, the sole body including a footbed portion that supports a foot sole of the foot of the wearer in an attached state in which the sole body is attached to the shell, wherein
the outsole portion includes
an inner side surface that covers a peripheral surface of the footbed portion in the attached state, and
an inner side bottom surface that covers a bottom surface of the footbed portion in the attached state,
the footbed portion includes a shock absorbing portion formed of a single member made of an elastic body so as to extend to the peripheral surface of the footbed portion,
the shock absorbing portion is formed of a three-dimensional mesh structure body,
an engaged portion is provided in the inner side surface of the outsole portion, and an engaging portion that engages with the engaged portion is provided in a portion of the shock absorbing portion that corresponds to the peripheral surface of the footbed portion,
one of the engaged portion and the engaging portion is formed as a protruding portion protruding in a direction substantially parallel to the ground contact surface,
the other one of the engaged portion and the engaging portion is formed as a cutout portion, the cutout portion being
a recessed portion recessed in a direction substantially parallel to the ground contact surface, or
a hole portion penetrating in a direction substantially parallel to the ground contact surface, and
by engaging the protruding portion with the cutout portion such that the protruding portion is sandwiched by the cutout portion in a direction intersecting the ground contact surface, the attached state is maintained, and an occupied volume ratio of a region including at least a portion defining the engaging portion in the shock absorbing portion is locally increased.

Supplementary Note 2

The footwear according to Supplementary Note 1, wherein
the engaged portion extends in a peripheral direction of the inner side surface of the outsole portion, and
the engaging portion extends in a peripheral direction of the peripheral surface of the footbed portion.

Supplementary Note 3

The footwear according to Supplementary Note 1 or 2, wherein, in the attached state, the engaging portion engages with the engaged portion in a state in which the engaging portion is compressed by the engaged portion.

Supplementary Note 4

The footwear according to any one of Supplementary Notes 1 to 3, wherein
the shock absorbing portion is extending not only to the peripheral surface of the footbed portion but also to a top surface of the footbed portion, and
the region of the shock absorbing portion in which the occupied volume ratio is locally increased extends to a boundary portion between the peripheral surface of the footbed portion and the top surface of the footbed portion.

Supplementary Note 5

The footwear according to any one of Supplementary Notes 1 to 4, wherein
the shock absorbing portion extends not only to the peripheral surface of the footbed portion but also to the bottom surface of the footbed portion,
a through hole is provided in the outsole portion so as to extend to a portion defining the ground contact surface of the outsole portion and a portion defining the inner side bottom surface of the outsole portion, and
in the attached state, the through hole faces a portion of the shock absorbing portion that corresponds to the bottom surface of the footbed portion.

Supplementary Note 6

The footwear according to any one of Supplementary Notes 1 to 5, wherein
the engaged portion is disposed in each of a front side portion and a rear side portion of the outsole portion, the front side portion and the rear side portion of the outsole portion being located on a front side and a rear side, respectively, in a foot length direction of the foot of the wearer,
the engaging portion is disposed in each of a front side portion and a rear side portion of the footbed portion, the front side portion and the rear side portion of the footbed portion being located on the front side and the rear side, respectively, in the foot length direction, and
by engaging the engaging portion with the engaged portion in each of a front side portion and a rear side portion of the footwear, the front side portion and the rear side portion of the footwear being located on the front side and the rear side, respectively, in the foot length direction, the attached state is maintained.

Supplementary Note 7

The footwear according to Supplementary Note 6, wherein
the engaged portion is disposed in each of a medial foot-side portion and a lateral foot-side portion of the outsole portion,
the engaging portion is disposed in each of a medial foot-side portion and a lateral foot-side portion of the footbed portion, and
by engaging the engaging portion with the engaged portion in each of a medial foot-side portion and a lateral foot-side portion of the footwear, the attached state is maintained.

Supplementary Note 8

The footwear according to Supplementary Note 7, wherein
the engaged portion disposed in each of the front side portion and the rear side portion of the outsole portion is the protruding portion,
the engaging portion disposed in each of the front side portion and the rear side portion of the footbed portion is the recessed portion,
the engaged portion disposed in each of the medial foot-side portion and the lateral foot-side portion of the outsole portion is the hole portion, and
the engaging portion disposed in each of the medial foot-side portion and the lateral foot-side portion of the footbed portion is the protruding portion.

Other Embodiments

The shape, the configuration, the size, the number, the material, and the like of each of the portions presented in the above-described embodiments and their modifications of the present disclosure can be variously modified unless departing from the gist of the present disclosure.

Further, the characteristic configurations presented in the above-described embodiments and their modifications of the present disclosure can naturally be combined with each other without departing from the gist of the present disclosure.

Although the embodiments of the present disclosure have been described above, it should be understood that the embodiments disclosed herein are illustrative and non-restrictive in every respect. The scope of the present invention is defined by the scope of the claims and is intended to include any modifications within the meaning and scope equivalent to the terms of the claims.

What is claimed is:

1. Footwear comprising:
a shell including an outsole portion with a ground contact surface and a foot cover portion configured to cover an instep of a foot of a wearer, and
a sole body detachably attached to the shell, the sole body including a footbed portion configured to support a foot sole of the foot of the wearer in an attached state in which the sole body is attached to the shell,
the outsole portion includes
an inner side surface covering a peripheral surface of the footbed portion in the attached state, and
an inner side bottom surface covering a bottom surface of the footbed portion in the attached state,
the footbed portion includes a shock absorbing portion formed of a single member made of an elastic body so as to extend to the peripheral surface of the footbed portion,
the shock absorbing portion is a three-dimensional mesh structure body,
an engaged portion disposed in the inner side surface of the outsole portion, and an engaging portion configured to engage the engaged portion, the engaging portion disposed in a portion of the shock absorbing portion that corresponds to the peripheral surface of the footbed portion, one of the engaged portion and the engaging portion being a protruding portion protruding in a direction substantially parallel to the ground contact surface, an other one of the engaged portion and the engaging portion is a cutout portion, the cutout portion being a recessed portion recessed in a direction substantially parallel to the ground contact surface, or a hole portion penetrating in a direction substantially parallel to the ground contact surface, and the attached state is maintained by engaging the protruding portion with the cutout portion such that the protruding portion is sandwiched by the cutout portion in a direction intersecting the ground contact surface, and an occupied volume ratio of a region including at least a portion defining the engaging portion in the shock absorbing portion is locally increased.

2. The footwear according to claim 1, wherein
the engaged portion extends in a peripheral direction of the inner side surface of the outsole portion, and
the engaging portion extends in a peripheral direction of the peripheral surface of the footbed portion.

3. The footwear according to claim 1, wherein, in the attached state, the engaging portion engages with the engaged portion such that the engaging portion is compressed by the engaged portion.

4. The footwear according to claim 1, wherein
the shock absorbing portion extends to the peripheral surface of the footbed portion and to a top surface of the footbed portion, and
the region of the shock absorbing portion in which the occupied volume ratio is locally increased extends to a boundary portion between the peripheral surface of the footbed portion and the top surface of the footbed portion.

5. The footwear according to claim 1, wherein
the shock absorbing portion extends to the peripheral surface of the footbed portion and to the bottom surface of the footbed portion,
a through hole is disposed in the outsole portion so as to extend to a portion defining the ground contact surface of the outsole portion and a portion defining the inner side bottom surface of the outsole portion, and
in the attached state, the through hole faces a portion of the shock absorbing portion that corresponds to the bottom surface of the footbed portion.

6. The footwear according to claim 1, wherein
the engaged portion is disposed in each of a front side portion and a rear side portion of the outsole portion, the front side portion and the rear side portion of the outsole portion being located on a front side and a rear side, respectively, in a foot length direction of the foot of the wearer,
the engaging portion is disposed in each of a front side portion and a rear side portion of the footbed portion, the front side portion and the rear side portion of the footbed portion being located on the front side and the rear side, respectively, in the foot length direction, and
the attached state is maintained by engaging the engaging portion with the engaged portion in each of a front side portion and a rear side portion of the footwear, the front side portion and the rear side portion of the footwear being located on the front side and the rear side, respectively, in the foot length direction.

7. The footwear according to claim 6, wherein
the engaged portion is disposed in each of a medial foot-side portion and a lateral foot-side portion of the outsole portion,
the engaging portion is disposed in each of a medial foot-side portion and a lateral foot-side portion of the footbed portion, and
the attached state is maintained by engaging the engaging portion with the engaged portion in each of a medial foot-side portion and a lateral foot-side portion of the footwear.

8. The footwear according to claim 7, wherein
the engaged portion disposed in each of the front side portion and the rear side portion of the outsole portion is the protruding portion,
the engaging portion disposed in each of the front side portion and the rear side portion of the footbed portion is the recessed portion,
the engaged portion disposed in each of the medial foot-side portion and the lateral foot-side portion of the outsole portion is the hole portion, and
the engaging portion disposed in each of the medial foot-side portion and the lateral foot-side portion of the footbed portion is the protruding portion.

9. The footwear according to claim 8, wherein
the engaged portion extends in a peripheral direction of the inner side surface of the outsole portion, and
the engaging portion extends in a peripheral direction of the peripheral surface of the footbed portion.

10. The footwear according to claim 9, wherein, in the attached state, the engaging portion engages with the engaged portion such that the engaging portion is compressed by the engaged portion.

11. The footwear according to claim 8, wherein, in the attached state, the engaging portion engages with the engaged portion such that the engaging portion is compressed by the engaged portion.

12. The footwear according to claim 7, wherein
the engaged portion extends in a peripheral direction of the inner side surface of the outsole portion, and
the engaging portion extends in a peripheral direction of the peripheral surface of the footbed portion.

13. The footwear according to claim 12, wherein, in the attached state, the engaging portion engages with the engaged portion such that the engaging portion is compressed by the engaged portion.

14. The footwear according to claim 7, wherein, in the attached state, the engaging portion engages with the engaged portion such that the engaging portion is compressed by the engaged portion.

15. The footwear according to claim 6, wherein
the engaged portion extends in a peripheral direction of the inner side surface of the outsole portion, and
the engaging portion extends in a peripheral direction of the peripheral surface of the footbed portion.

16. The footwear according to claim 15, wherein, in the attached state, the engaging portion engages with the engaged portion such that the engaging portion is compressed by the engaged portion.

17. The footwear according to claim 6, wherein, in the attached state, the engaging portion engages with the engaged portion such that the engaging portion is compressed by the engaged portion.

* * * * *